(12) United States Patent
AlBahrani et al.

(10) Patent No.: US 11,954,800 B2
(45) Date of Patent: Apr. 9, 2024

(54) CONVERTING BOREHOLE IMAGES INTO THREE DIMENSIONAL STRUCTURES FOR NUMERICAL MODELING AND SIMULATION APPLICATIONS

(71) Applicant: Saudi Arabian Oil Company, Dhahran (SA)

(72) Inventors: Hussain AlBahrani, Al Qatif (SA); Zahrah Marhoon, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 310 days.

(21) Appl. No.: 17/644,145

(22) Filed: Dec. 14, 2021

(65) Prior Publication Data

US 2023/0186564 A1    Jun. 15, 2023

(51) Int. Cl.
*G06T 17/20*    (2006.01)
*E21B 47/002*    (2012.01)
(Continued)

(52) U.S. Cl.
CPC ............ *G06T 17/20* (2013.01); *E21B 47/002* (2020.05); *E21B 49/00* (2013.01); *G01N 23/046* (2013.01);
(Continued)

(58) Field of Classification Search
None
See application file for complete search history.

(56) References Cited

U.S. PATENT DOCUMENTS 2,286,673 A    6/1942   Douglas
2,757,738 A    9/1948   Ritchey
(Continued)

FOREIGN PATENT DOCUMENTS

CA    2669721    7/2011
CA    2926192    4/2015
(Continued)

OTHER PUBLICATIONS

U.S. Appl. No. 12/974,759, filed Dec. 21, 2010, Sadlier et al.
(Continued)

*Primary Examiner* — Sarah Le
(74) *Attorney, Agent, or Firm* — Fish & Richardson P.C.

(57) ABSTRACT

A computer-implemented method, medium, and system for converting borehole images into three dimensional structures for numerical modeling and simulation applications are disclosed. In one computer-implemented method, multiple CT-scan images of a core sample of a rock are received, where the core sample includes a borehole, and the multiple CT-scan images are cross-section images of the core sample at multiple depths of the borehole. A triangulation process is performed on pixels of each CT-scan image and with respect to each of multiple circumferential position angles. Multiple radii of the borehole corresponding to the multiple circumferential position angles are determined for each CT-scan image. Multiple nodal coordinates of 3D numerical model mesh of the borehole are generated based on the multiple radii of the borehole. An advisory on drilling window limits of mud weight is provided based on the multiple nodal coordinates of the 3D numerical model mesh of the borehole.

20 Claims, 36 Drawing Sheets

(51) Int. Cl.
| | |
|---|---|
| *E21B 49/00* | (2006.01) |
| *G01N 23/046* | (2018.01) |
| *G01V 99/00* | (2009.01) |
| *G06T 3/40* | (2006.01) |
| *G06T 5/00* | (2006.01) |
| *G06T 5/50* | (2006.01) |
| *G06T 7/55* | (2017.01) |
| *G06T 7/60* | (2017.01) |

(52) U.S. Cl.
CPC .............. *G01V 99/005* (2013.01); *G06T 3/40* (2013.01); *G06T 5/007* (2013.01); *G06T 5/50* (2013.01); *G06T 7/55* (2017.01); *G06T 7/60* (2013.01); *E21B 2200/20* (2020.05); *G01N 2223/401* (2013.01); *G01N 2223/616* (2013.01); *G06T 2207/10081* (2013.01)

(56) References Cited

U.S. PATENT DOCUMENTS

| | | |
|---|---|---|
| 2,509,608 A | 5/1950 | Penfield |
| 2,688,369 A | 9/1954 | Broyles |
| 2,719,363 A | 10/1955 | Richard et al. |
| 2,795,279 A | 6/1957 | Erich |
| 2,799,641 A | 7/1957 | Gordon |
| 2,805,045 A | 9/1957 | Goodwin |
| 2,848,469 A | 8/1958 | Kroll |
| 3,016,244 A | 1/1962 | Friedrich et al. |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberlin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,200,106 A | 8/1965 | Dickson |
| 3,211,220 A | 10/1965 | Erich |
| 3,428,125 A | 2/1969 | Parker |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,696,866 A | 10/1972 | Dryden |
| 3,750,768 A | 8/1973 | Suman, Jr. et al. |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,030,548 A | 6/1977 | Richardson et al. |
| 4,081,030 A | 3/1978 | Carpenter |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,287,946 A | 9/1981 | Brieger |
| 4,301,865 A | 11/1981 | Kasevich et al. |
| 4,320,801 A | 3/1982 | Rowland et al. |
| 4,354,559 A | 10/1982 | Johnson |
| 4,373,581 A | 2/1983 | Toellner |
| 4,396,062 A | 8/1983 | Iskander |
| 4,412,585 A | 11/1983 | Bouck |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,576,231 A | 3/1986 | Dowling et al. |
| 4,583,589 A | 4/1986 | Kasevich |
| 4,589,504 A | 5/1986 | Simpson |
| 4,592,423 A | 6/1986 | Savage et al. |
| 4,612,988 A | 9/1986 | Segalman |
| 4,620,593 A | 11/1986 | Haagensen |
| 4,660,636 A | 4/1987 | Rundell et al. |
| 4,705,108 A | 11/1987 | Little et al. |
| 4,776,410 A | 10/1988 | Perkin et al. |
| 4,817,711 A | 4/1989 | Jearnbey |
| 4,981,036 A | 1/1991 | Curry et al. |
| 5,055,180 A | 10/1991 | Klaila |
| 5,068,819 A | 11/1991 | Misra et al. |
| 5,082,054 A | 1/1992 | Kiamanesh |
| 5,092,056 A | 3/1992 | Deaton |
| 5,236,039 A | 8/1993 | Edelstein et al. |
| 5,574,371 A | 11/1996 | Tabanou et al. |
| 5,612,293 A | 3/1997 | Swartwout et al. |
| 5,842,149 A | 11/1998 | Harell et al. |
| 5,890,540 A | 4/1999 | Pia et al. |
| 5,899,274 A | 5/1999 | Frauenfeld et al. |
| 5,947,213 A | 9/1999 | Angle |
| 6,041,860 A | 3/2000 | Nazzal et al. |
| 6,078,867 A | 6/2000 | Plumb et al. |
| 6,164,126 A | 12/2000 | Ciglenec et al. |
| 6,173,795 B1 | 1/2001 | McGarian et al. |
| 6,180,571 B1 | 1/2001 | Sifferman et al. |
| 6,189,611 B1 | 2/2001 | Kasevich |
| 6,413,399 B1 | 7/2002 | Kasevich |
| 6,544,411 B2 | 4/2003 | Varandaraj |
| 6,678,616 B1 | 1/2004 | Winkler et al. |
| 6,814,141 B2 | 11/2004 | Huh et al. |
| 7,048,051 B2 | 5/2006 | McQueen |
| 7,091,460 B2 | 8/2006 | Kinzer |
| 7,109,457 B2 | 9/2006 | Kinzer |
| 7,114,562 B2 | 10/2006 | Fisseler et al. |
| 7,115,847 B2 | 10/2006 | Kinzer |
| 7,131,498 B2 | 11/2006 | Campo et al. |
| 7,279,677 B2 | 10/2007 | Ellis et al. |
| 7,312,428 B2 | 12/2007 | Kinzer |
| 7,331,385 B2 | 2/2008 | Symington |
| 7,445,041 B2 | 11/2008 | O'Brien |
| 7,461,693 B2 | 12/2008 | Considine et al. |
| 7,484,561 B2 | 2/2009 | Bridges |
| 7,562,708 B2 | 7/2009 | Cogliandro et al. |
| 7,596,481 B2 * | 9/2009 | Zamora ................ E21B 47/002 702/6 |
| 7,629,497 B2 | 12/2009 | Pringle |
| 7,630,872 B2 | 12/2009 | Xia et al. |
| 7,631,691 B2 | 12/2009 | Symington et al. |
| 7,677,673 B2 | 3/2010 | Tranquilla et al. |
| 7,828,057 B2 | 11/2010 | Kearl et al. |
| 7,909,096 B2 | 3/2011 | Clark et al. |
| 8,096,349 B2 | 1/2012 | Considine et al. |
| 8,210,256 B2 | 7/2012 | Bridges et al. |
| 8,457,940 B2 | 6/2013 | Xi et al. |
| 8,526,171 B2 | 9/2013 | Wu et al. |
| 8,548,783 B2 | 10/2013 | Dean et al. |
| 8,678,087 B2 | 3/2014 | Schultz et al. |
| 8,824,240 B2 | 9/2014 | Roberts et al. |
| 8,925,213 B2 | 1/2015 | Sallwasser |
| 8,960,215 B2 | 2/2015 | Cui et al. |
| 8,962,535 B2 | 2/2015 | Welton et al. |
| 9,217,291 B2 | 12/2015 | Batarseh |

(56) References Cited

U.S. PATENT DOCUMENTS

| | | |
|---|---|---|
| 9,217,323 B2 | 12/2015 | Clark |
| 9,353,305 B1 | 5/2016 | Jiang et al. |
| 9,567,819 B2 | 2/2017 | Cavender et al. |
| 9,765,609 B2 | 9/2017 | Chemali et al. |
| 9,874,806 B2 | 1/2018 | Takahara et al. |
| 10,088,725 B2 | 10/2018 | Umezaki |
| 10,330,915 B2 | 6/2019 | Rudolf et al. |
| 10,334,437 B2 | 6/2019 | Katsman et al. |
| 10,400,570 B2 | 9/2019 | Erge et al. |
| 10,641,079 B2 | 5/2020 | Aljubran et al. |
| 10,927,618 B2 | 2/2021 | Albahrani et al. |
| 10,941,644 B2 | 3/2021 | Aljubran et al. |
| 10,982,124 B2 | 4/2021 | AlBahrani et al. |
| 11,187,068 B2 | 11/2021 | Batarseh |
| 2003/0075339 A1 | 4/2003 | Gano |
| 2004/0020693 A1 | 2/2004 | Damhof et al. |
| 2004/0221985 A1 | 11/2004 | Hill et al. |
| 2004/0256103 A1 | 12/2004 | Batarseh |
| 2005/0199386 A1 | 9/2005 | Kinzer |
| 2006/0076347 A1 | 4/2006 | Kinzer |
| 2006/0102625 A1 | 5/2006 | Kinzer |
| 2006/0106541 A1 | 5/2006 | Hassan et al. |
| 2006/0144620 A1 | 7/2006 | Cooper |
| 2006/0200328 A1 | 9/2006 | Guo et al. |
| 2007/0000662 A1 | 1/2007 | Symington et al. |
| 2007/0108202 A1 | 5/2007 | Kinzer |
| 2007/0131591 A1 | 6/2007 | Pringle |
| 2007/0137852 A1 | 6/2007 | Considine et al. |
| 2007/0137858 A1 | 6/2007 | Considine et al. |
| 2007/0153626 A1 | 7/2007 | Hayes et al. |
| 2007/0181301 A1 | 8/2007 | O'Brien |
| 2007/0187089 A1 | 8/2007 | Bridges |
| 2007/0193744 A1 | 8/2007 | Bridges |
| 2007/0204994 A1 | 9/2007 | Wimmersperg |
| 2007/0261844 A1 | 11/2007 | Cogliandro et al. |
| 2007/0289736 A1 | 12/2007 | Kearl et al. |
| 2008/0070805 A1 | 3/2008 | Munoz et al. |
| 2008/0073079 A1 | 3/2008 | Tranquilla et al. |
| 2008/0173443 A1 | 7/2008 | Symington et al. |
| 2009/0084554 A1 | 4/2009 | Williamson et al. |
| 2009/0209825 A1 | 8/2009 | Efinger et al. |
| 2009/0259446 A1 | 10/2009 | Zhang et al. |
| 2009/0288820 A1 | 11/2009 | Barron et al. |
| 2010/0071957 A1 | 3/2010 | Huang et al. |
| 2010/0089583 A1 | 4/2010 | Xu et al. |
| 2010/0186955 A1 | 7/2010 | Saasen et al. |
| 2010/0282511 A1 | 11/2010 | Maranuk |
| 2010/0326659 A1 | 12/2010 | Schultz et al. |
| 2011/0011576 A1 | 1/2011 | Cavender et al. |
| 2011/0153296 A1 | 6/2011 | Sadlier et al. |
| 2011/0168395 A1 | 7/2011 | Welton et al. |
| 2011/0312857 A1 | 12/2011 | Amanullah et al. |
| 2012/0012319 A1 | 1/2012 | Dennis |
| 2012/0075615 A1 | 3/2012 | Niclass et al. |
| 2012/0123756 A1 | 5/2012 | Wang et al. |
| 2012/0169841 A1 | 6/2012 | Chemali et al. |
| 2012/0181020 A1 | 7/2012 | Barron et al. |
| 2012/0273187 A1 | 11/2012 | Hall |
| 2013/0008653 A1 | 1/2013 | Schultz et al. |
| 2013/0037268 A1 | 2/2013 | Kleefisch et al. |
| 2013/0126164 A1 | 5/2013 | Sweatman et al. |
| 2013/0191029 A1 | 7/2013 | Heck, Sr. |
| 2013/0213637 A1 | 8/2013 | Kearl |
| 2013/0255936 A1 | 10/2013 | Statoilydro et al. |
| 2013/0261032 A1 | 10/2013 | Ladva |
| 2014/0032192 A1 | 1/2014 | Zamora et al. |
| 2014/0034144 A1 | 2/2014 | Cui et al. |
| 2014/0083771 A1 | 3/2014 | Clark |
| 2014/0090846 A1 | 4/2014 | Deutch |
| 2014/0116776 A1 | 5/2014 | Trent et al. |
| 2014/0122035 A1 | 5/2014 | Dean et al. |
| 2014/0151042 A1 | 6/2014 | Faugerstrom et al. |
| 2014/0190695 A1 | 7/2014 | van Zanten et al. |
| 2014/0231146 A1 | 8/2014 | Nguyen |
| 2014/0231147 A1 | 8/2014 | Bozso et al. |
| 2014/0278111 A1 | 9/2014 | Gerrie et al. |
| 2014/0360778 A1 | 12/2014 | Batarseh |
| 2015/0055438 A1* | 2/2015 | Yan .......................... G01V 1/282 |
| | | 367/73 |
| 2015/0083422 A1 | 3/2015 | Pritchard |
| 2015/0101864 A1 | 4/2015 | May |
| 2015/0176400 A1* | 6/2015 | Kulathu .................. E21B 43/26 |
| | | 703/10 |
| 2015/0191640 A1 | 7/2015 | Lee et al. |
| 2015/0267500 A1 | 9/2015 | Van Dogen |
| 2016/0053572 A1 | 2/2016 | Snoswell |
| 2016/0076357 A1 | 3/2016 | Hbaeib et al. |
| 2016/0153240 A1 | 6/2016 | Braga et al. |
| 2016/0247316 A1 | 8/2016 | Whalley et al. |
| 2017/0044889 A1 | 2/2017 | Rudolf et al. |
| 2017/0234104 A1 | 8/2017 | James |
| 2017/0342776 A1 | 11/2017 | Bullock et al. |
| 2018/0010419 A1 | 1/2018 | Livescu et al. |
| 2018/0051548 A1 | 2/2018 | Liu et al. |
| 2018/0119535 A1 | 5/2018 | Shen et al. |
| 2018/0266226 A1 | 9/2018 | Batarseh et al. |
| 2019/0257973 A1 | 8/2019 | AlBahrani et al. |
| 2020/0018159 A1* | 1/2020 | Ameen .................. E21B 47/14 |
| 2021/0156243 A1 | 5/2021 | Aljubran et al. |

FOREIGN PATENT DOCUMENTS

| | | |
|---|---|---|
| CN | 101079591 | 11/2007 |
| CN | 102493813 | 6/2012 |
| CN | 102597419 | 7/2012 |
| CN | 103377307 | 10/2013 |
| CN | 104295448 | 1/2015 |
| CN | 204627586 | 9/2015 |
| CN | 105392954 | 3/2016 |
| CN | 107462222 | 12/2017 |
| EP | 0326720 | 8/1989 |
| EP | 2317068 | 5/2011 |
| EP | 2574722 | 4/2013 |
| EP | 2737173 | 6/2014 |
| WO | WO 2002068793 | 9/2002 |
| WO | WO 2008146017 | 12/2008 |
| WO | WO 2009020889 | 2/2009 |
| WO | WO 2011038170 | 3/2011 |
| WO | WO 2011083182 | 7/2011 |
| WO | WO 2013189842 | 12/2013 |
| WO | WO 2015095155 | 6/2015 |
| WO | WO 2016178005 | 11/2016 |
| WO | WO 2017011078 | 1/2017 |
| WO | WO 2017082860 | 5/2017 |
| WO | WO 2018169991 | 9/2018 |

OTHER PUBLICATIONS

Adham, "Geomechanics model for wellbore stability analysis in Field 'X', North Samatra Basin," retrieved from URL <https://mountainscholar.org/bitstream/handle/11124/170314/Adham_mines_0052N_11059.pdf?sequence=1>, Jan. 1, 2016, 121 pages.

Albukhari et al., "Geomechanical Wellbore Stability Analysis for the Reservoir Section in J-NC186 Oil Field," retrieved from URL <https://www.onepetro.org/download/conference-paper/ISRM-TUNIROCK-2018-22?id=conference-paper/ISRM-TUNIROCK-2018-22>, retrieved on Oct. 14, 2019, published Mar. 31, 2018, 15 pages.

Al-Haidary, "Wellbore Stability Assessment in a Shale Formation," retrieved from URL <http://eprints.kfupm.edu.sa/139181/1/Wellbore_Stability_Assessment_in_a_shale_formation_Saleh_AlHaidary.pdf>, retrieved on Oct. 14, 2019, published May 1, 2014, 136 pages.

Alsubaih, "Shale instability of deviated wellbores in southern Iraqi frields," retrieved from URL <http://scholarsmine.mst.edu/cgi/viewcontent.cgi?article=8544&context=masters_theses>, retrieved on Oct. 14, 2019, published Jan. 1, 2016, 129 pages.

Aminzadeh, "Pattern recognition and imaging processing," Geophysical Press Limited, 1987, 5 pages, with English Abstract.

Ashby et al., "Coiled Tubing Conveyed Video Camera and Multi-Arm Caliper Liner Damage Diagnostics Post Plug and Perf Frac," Society of Petroleum Engineers, SPE-172622-MS, Mar. 2015, pp. 12.

(56) References Cited

OTHER PUBLICATIONS

Caryotakis, "The klystron: A microwave source of surprising range and endurance." The American Physical Society, Division of Plasma Physics Conference in Pittsburg, PA, Nov. 1997, 14 pages.

Gemmeke and Ruiter, "3D ultrasound computer tomography for medical imagining," Nuclear Instruments and Methods in Physics Research A 580, Oct. 1, 2007, 9 pages.

Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.

Kosset, "Wellbore integrity analysis for wellpath optimization and drilling risks reduction: the vaca muerta formation in neuquen basin," retrieved from URL <https://mountainscholar.org/bitstream/handle/11124/464/Kosset_mines_0052N_10469.pdf?sequence=1&i sAllowe3=y>, published Jan. 1, 2014, 131 pages.

Lang et al., "Wellbore Stability Modeling and Real-Time Surveillance for Deepwater Drilling to Weak Bedding Planes and Depleted Reservoirs," Society of Petroleum Engineers (SPE), Mar. 1, 2011, 18 pages.

Li et al., "Pore-pressure and wellbore-stability prediction to increase drilling efficiency," Journal of Petroleum Technology, Feb. 28, 2012, 4 pages.

Mokhtari et al., "Characterization of Complex Fracture Propagation in Naturally Fractured Formations Using Digital Image Correlation Technique," Society of Petroleum Engineers (SPE), presented at the SPE Hydraulic Fracturing Technology Conference and Exhibition, The Woodlands, Texas, USA, Jan. 2017, 11 pages.

Ruiter et al., "3D ultrasound computer tomography of the breast: A new era?" European Journal of Radiology 81S1, Sep. 2012, 2 pages.

Tan et al., "Wellbore Stability of Extended Reach Wells in an Oil Filed in Sarawak Basin, South China Sea," SPE88609, Society of Petroleum Engineers (SPE), SPE Proceedings, XX, XX, Oct. 18, 2004, 11 pages.

Tutuncu et al., "Annual Meeting Selections. Integrated Wellbore-Quality and Risk-Assessment Study Guides Successful Drilling in Amazon Jungle," Geophysics, Society of Exploration Geophysics, 71:6, Jan. 1, 2006, 7 pages.

\* cited by examiner

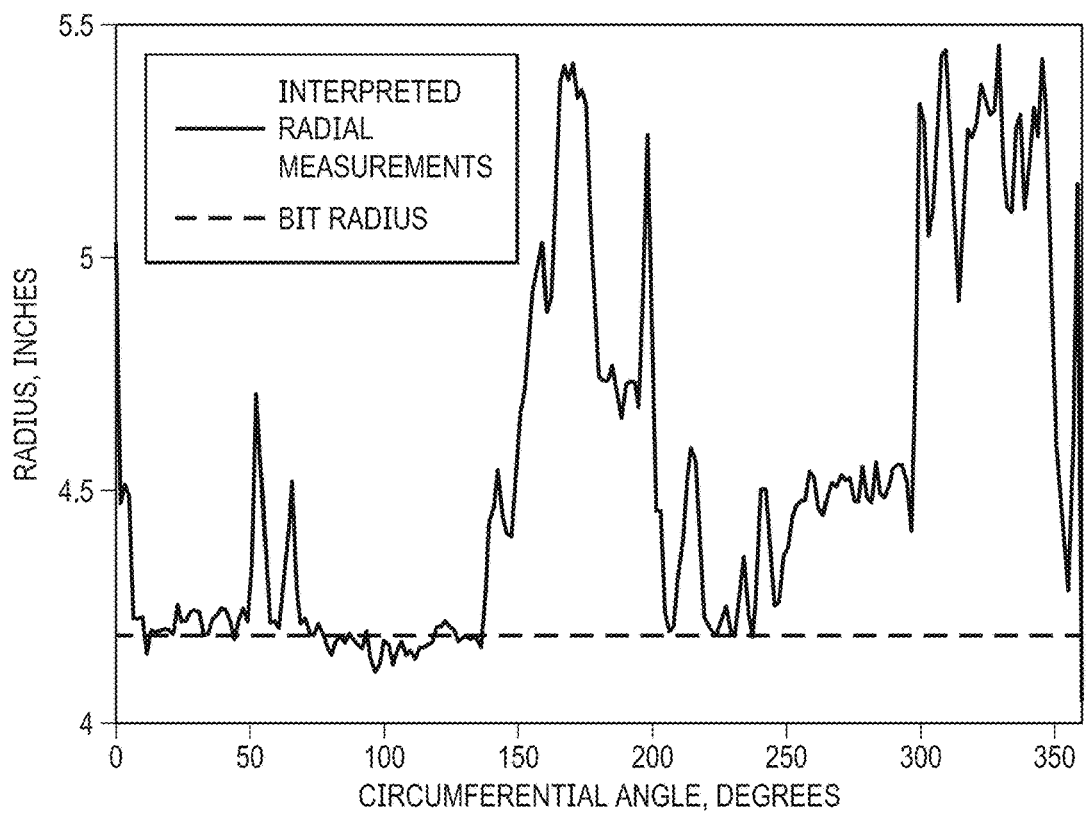
FIG. 13
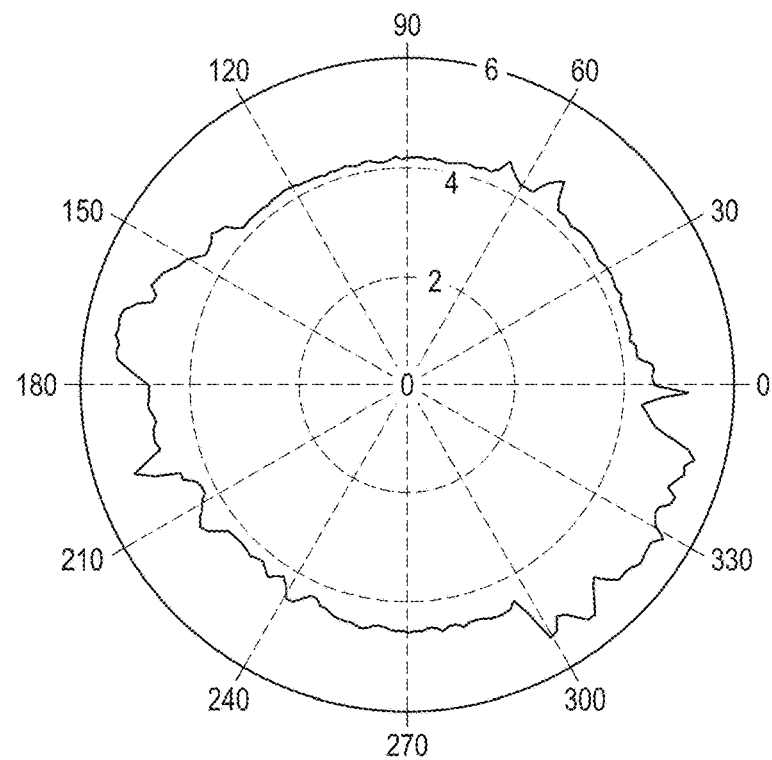

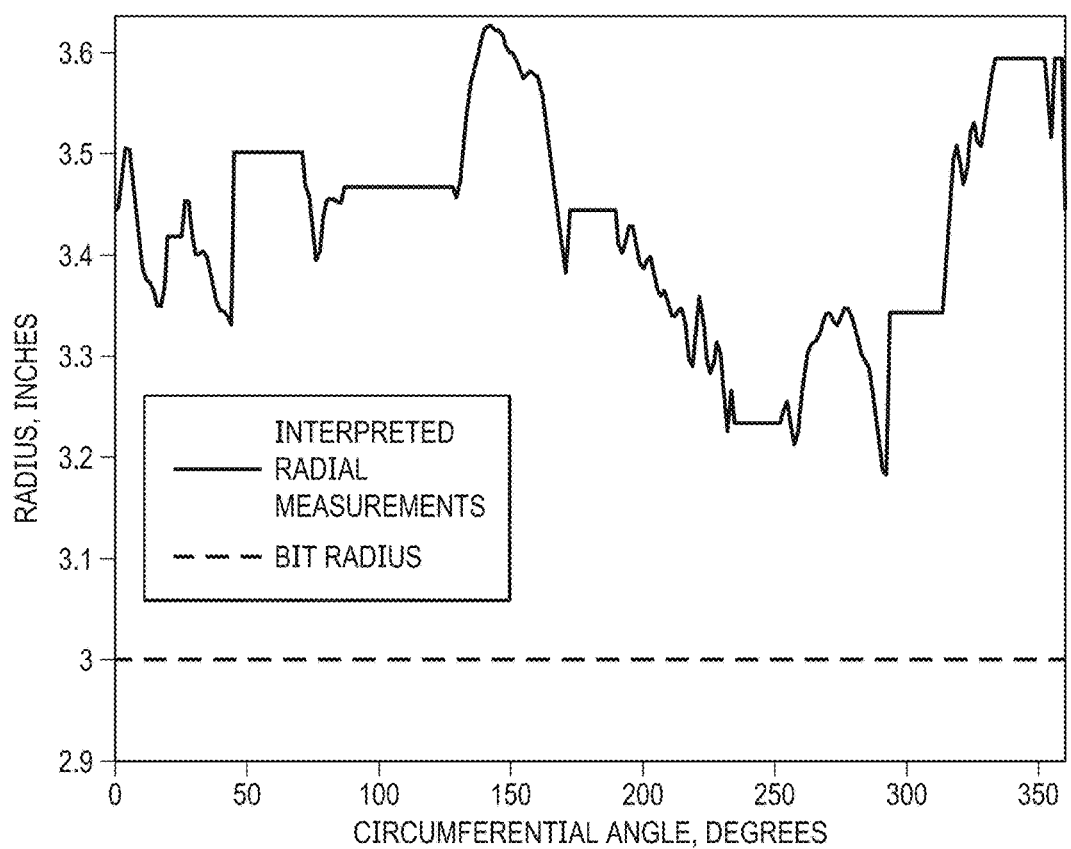
FIG. 17
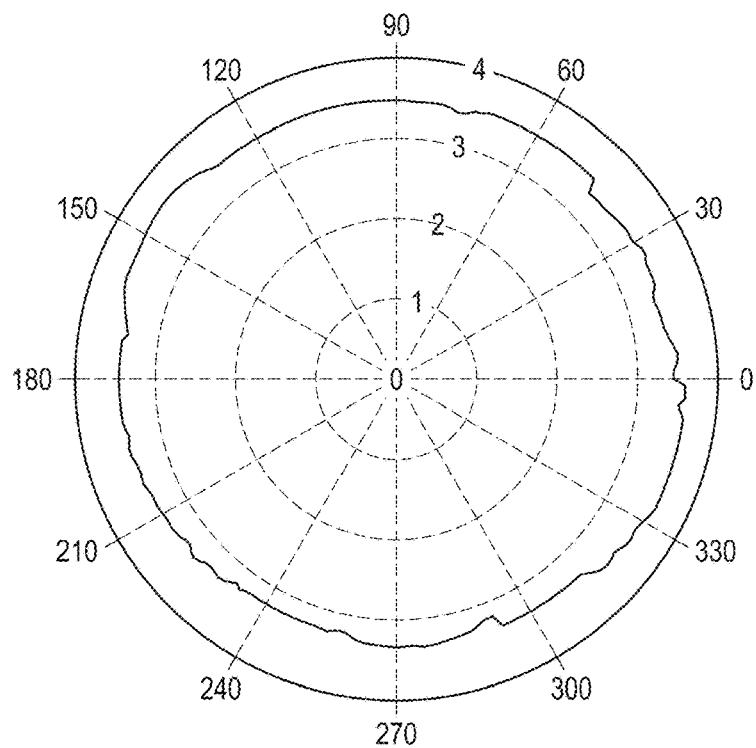

2200

CONVERTING BOREHOLE IMAGES INTO THREE DIMENSIONAL STRUCTURES FOR NUMERICAL MODELING AND SIMULATION APPLICATIONS

TECHNICAL FIELD

The present disclosure relates to computer-implemented methods, medium, and systems for converting borehole images into three dimensional structures for numerical modeling and simulation applications.

BACKGROUND

Quantitative description of wellbore failure is conventionally provided using mechanical multi-arm caliper logs, which provide radial measurements at four circumferential angles (0°, 90°, 180°, 270°) in their most common designs. On the other hand, drilling operations and supporting lab-based activities produce a substantial amount of data in the form of images. In the field, imaging tools are routinely run into the wellbore to extract information about the subterranean rock formations being drilled in the form of image logs. These imaging tools have a lot of variations in terms of imaging techniques and the format of produced images. The most common image logs are either resistivity based or ultrasonic-based. In laboratory environments, when rock core samples are tested for the purpose of measuring their mechanical properties and strength, different imaging techniques can be utilized to monitor the progression of failure in the rock matrix.

SUMMARY

The present disclosure involves computer-implemented method, medium, and system for converting borehole images into three dimensional structures for numerical modeling and simulation applications. One example computer-implemented method includes receiving multiple CT-scan images of a core sample of a rock, where the core sample of the rock includes a borehole, and the multiple CT-scan images are cross-section CT-scan images of the core sample of the rock at multiple depths of the borehole. A triangulation process is performed on pixels of each of the multiple CT-scan images for each of the multiple CT-scan images and with respect to each of multiple circumferential position angles. Multiple radii of the borehole corresponding to the multiple circumferential position angles are determined for each of the multiple CT-scan images. Multiple nodal coordinates of 3D numerical model mesh of the borehole are generated based on the multiple radii of the borehole of each of the multiple CT-scan images and using a meshing function. An advisory on drilling window limits of mud weight is provided for avoiding rock failure of a wellbore, based on the multiple nodal coordinates of the 3D numerical model mesh of the borehole.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DESCRIPTION OF DRAWINGS

FIG. 13 illustrates example results of the ultrasonic image log interpretation showing radial measurements in Cartesian and polar coordinates, in accordance with example implementations of this disclosure.

FIG. 17 illustrates example results of the image log interpretations that are calibrated with mechanical caliper log readings in both Cartesian and polar coordinates, in accordance with example implementations of this disclosure.

DETAILED DESCRIPTION

With the recent advancements in image analysis, there lies a potential to utilize the different forms of available images for extracting valuable information for drilling engineering applications. Different image logs from the field and different images from lab experiments can help inform drilling geomechanics models of the patterns and limits of a borehole rock failure. These images can be used to construct three-dimensional (3D) structures before and after rock failure takes place. These structures can then be converted to 3D meshes, which in turn can be employed within a numerical model, such as a finite element model (FEM), to estimate the stress distribution around the structure. The end result of this process is a more accurate depictions of the drilled structures and a more accurate prediction of the rock failure limits. On the other hand, conventionally quantitative description of wellbore failure may not provide a comprehensive description of the wellbore shape as well as images can, as mechanical multi-arm caliper logs usually only provide radial measurements at four circumferential angles (0°, 90°, 180°, 270°) in their most common designs.

This disclosure describes technologies for implementing a conversion from borehole images into three dimensional structures for numerical modeling and simulation applications. In some implementations, image analysis techniques can provide the ability to quantitatively determine the extent of wellbore wall rock failure from images. The quantitative description of failure from images can be used to provide a node-based classification of rock failure, which can be used to correlate the classification to each separate node in the numerical model mesh. By providing this link to the numerical model, a more accurate mapping of actual failures is now possible. The end result is an integrated FEM and machine learning (ML) model, which is trained based on offset wells data or previous lab experiments to predict the limits for rock failure in new wells or experiments.

In some implementations, image analysis techniques can enable numerical models to reflect the effect of different drilling events as they occur through images produced from logging while drilling (LWD) tools. This can ensure that events that led to changes to the wellbore geometry and shape can be reflected in the model mesh. This while-drilling consideration of changes to the wellbore shape and structure can enable the rock strength limits and probability of failure be updated as drilling progresses.

Figure 1:
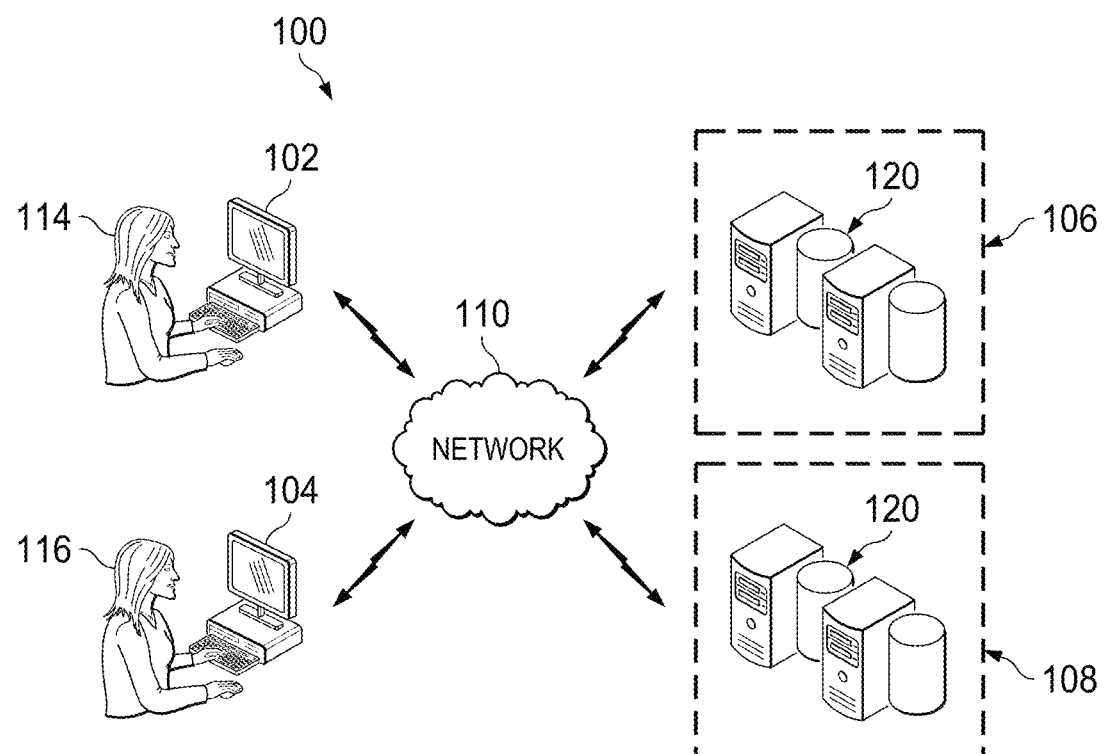
FIG. 1 depicts an environment architecture of an example computer-implemented system that can execute implementations of the present disclosure.

FIG. 1 depicts an environment architecture of an example computer-implemented system 100 that can execute implementations of the present disclosure. In the depicted example, the example system 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on VMs hosted on cloud infrastructure. In some instances, one application and/or service can run as multiple application instances on multiple corresponding VMs, where each instance is running on a corresponding VM.

An example algorithm for lab-based imaging for borehole radial measurements is described next.

Figure 3:
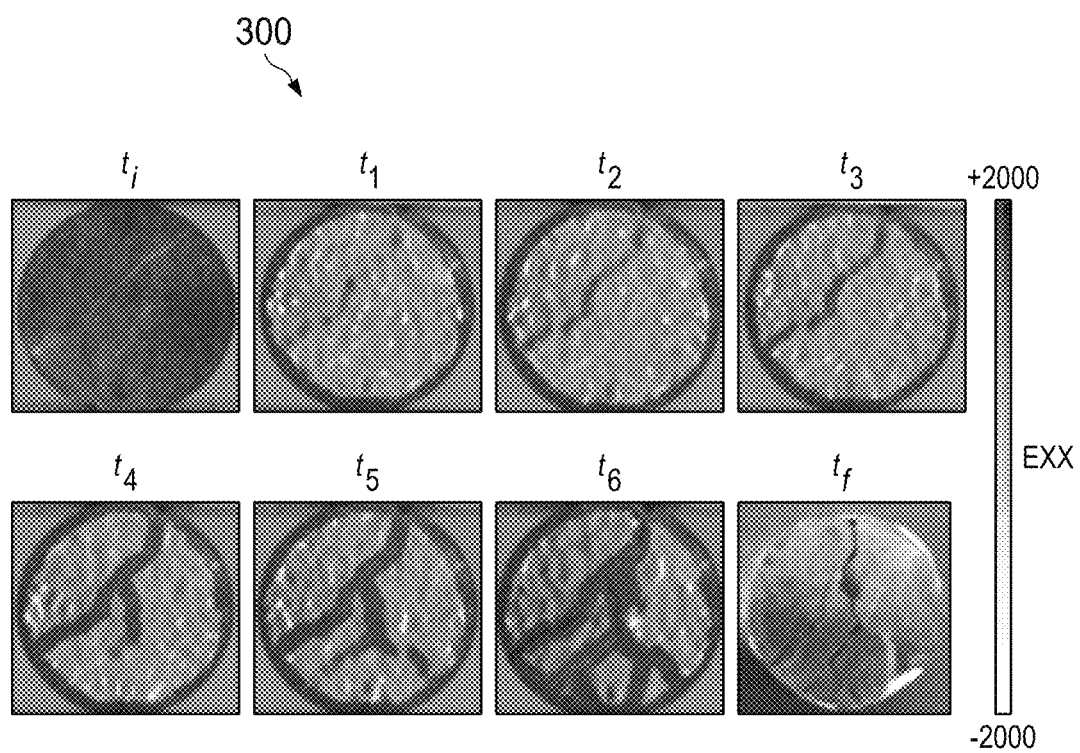
FIG. 3 illustrates example digital image correlation (DIC) images showing the progress of rock failure, in accordance with example implementations of this disclosure.
Figure 2:
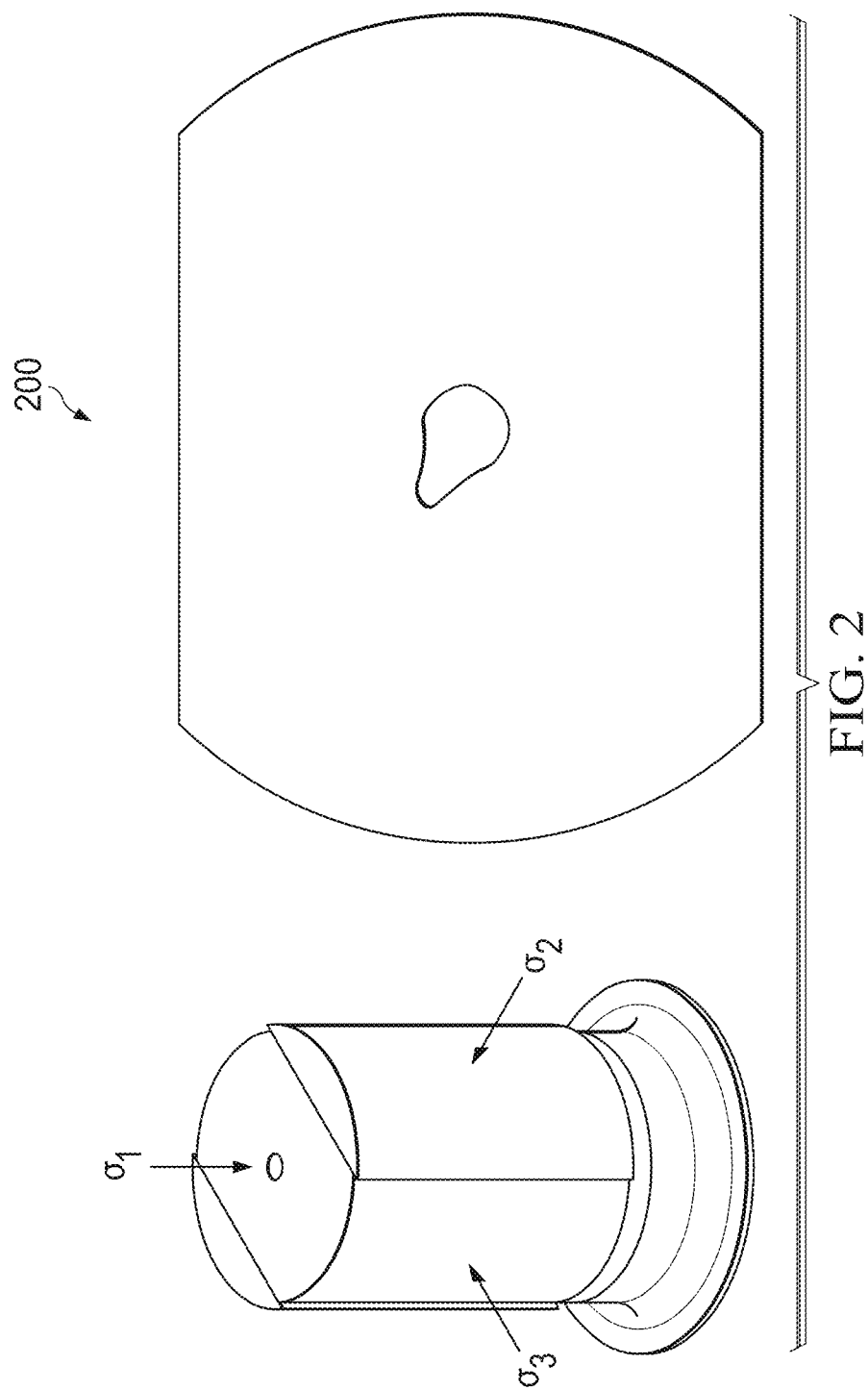
FIG. 2 illustrates an example CT-scan of a bored core sample showing the development of failure zones around the borehole, in accordance with example implementations of this disclosure.

In some implementations, Lab-based images, for example CT-scans or digital image correlation (DIC) images, can provide information regarding rock failure because they are more easily interpreted than field-based images. Field-based images such as resistivity image logs are taken downhole in challenging environments due to high pressure, temperature, and drilling fluids noise, and the visual clarity of these images may not be high. Therefore, field-based images may not be visually assessed for the extent of rock failure. This may not be the case for lab-based images. In CT-scans, which are one of the forms of lab images with an example shown in FIG. 2, the location and the extent of rock failure around a borehole in a core sample can be determined by visually examining the image. Therefore the bored core CT-scan algorithm can be used to identify the location of failure and determine the magnitude of failure in terms of change to the borehole radius. An example of DIC images capturing the progress of rock failure is shown in FIG. 3.

Figure 4A:
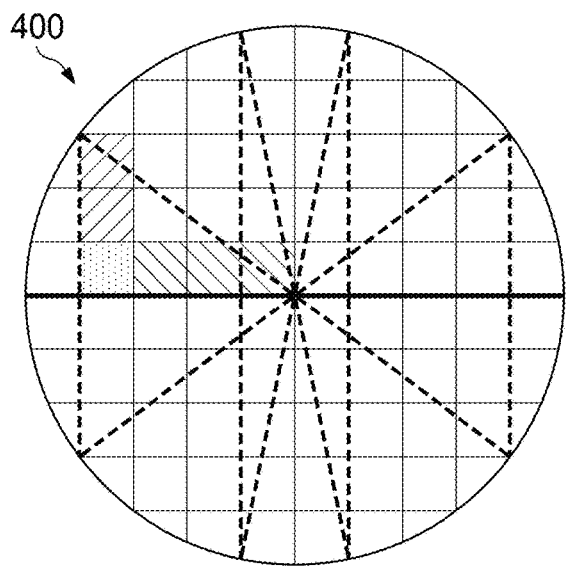
FIG. 4A, FIG. 4B, FIG. 4C, and FIG. 4D illustrate an example process of triangulation used to calculate the borehole radii from images, in accordance with example implementations of this disclosure.
Figure 4B:
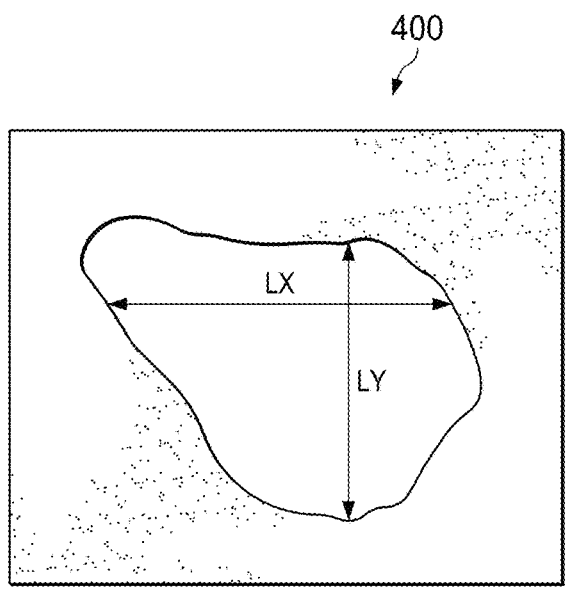

In some implementations, since the algorithm deals with images, the data points in the image are pixels and the value for each point is the red-green-blue (RGB) color number. The algorithm can differentiate between the borehole and the rock matrix by first adjusting the contrast of the image so that the borehole void is black colored, while the rock matrix is light gray colored. The CT-scan image algorithm can use the concept of triangulation to assess failure as illustrated in FIG. 4A. Through this concept of triangulation, a pixel that is centralized in the borehole can be selected, which can then be used as the first vertex of a triangle. Since the borehole shape in FIG. 4B is not circular, a center cannot be defined. Instead, this vertex is arbitrarily defined as the pixel that satisfies the intersection of the longest horizontal diameter (LX) with the longest vertical diameter (LY) of the non-uniformly shaped borehole as shown in FIG. 4B. From this vertex, horizontal and vertical straight lines are drawn by selecting the pixels from the defined vertex to the borehole wall. Then, a hypotenuse for a right triangle is formed at a specified angle. Next, the length of the hypotenuse is calculated using the Pythagorean theory. This calculated hypotenuse is one radial measurement, which is assigned to the circumferential position of the corresponding pixels. The total number of borehole pixels defining the adjacent and the opposite legs of the right triangle, as shown by the horizontal (HDim) and vertical (VDim) boxes in FIG. 4A, can be used in the Pythagorean theory calculation. This basic calculation is shown below:

$$\text{Radial Measurement for One Circumferential Position} = \sqrt{HDim^2 + VDim^2}$$

In some implementations, this pixel-based measurement of length can be converted to an actual measurement of length by using the detected image resolution. This is done by using a reference CT-scan that depicts a uniform borehole with a known diameter. Next, the image pixels that define the borehole void, which are characterized by a black color RGB value, can be filtered out. Then, the total number of pixels in a line that intersects the borehole center can be determined. These values can be used in the followed formula to calculate the actual length of a pixel in mm:

$$\text{Pixel Actual Length (mm)} = \frac{2 \times \text{Borehole Actual Radius (mm)}}{\text{Total Number of Pixels in the } LY \text{ Line}}$$

Figure 4C:
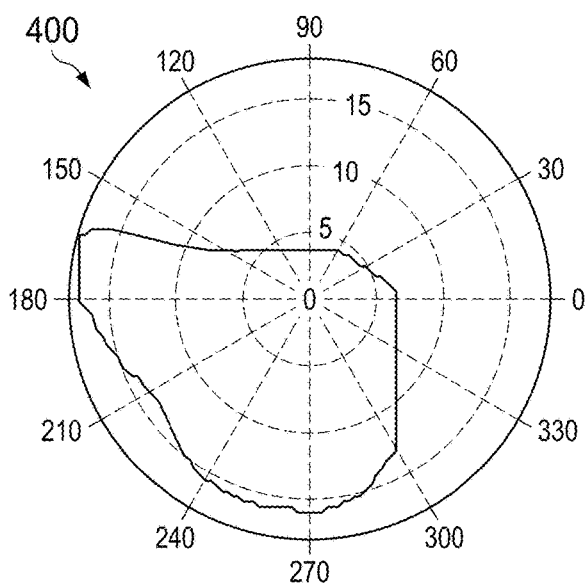
Figure 4D:
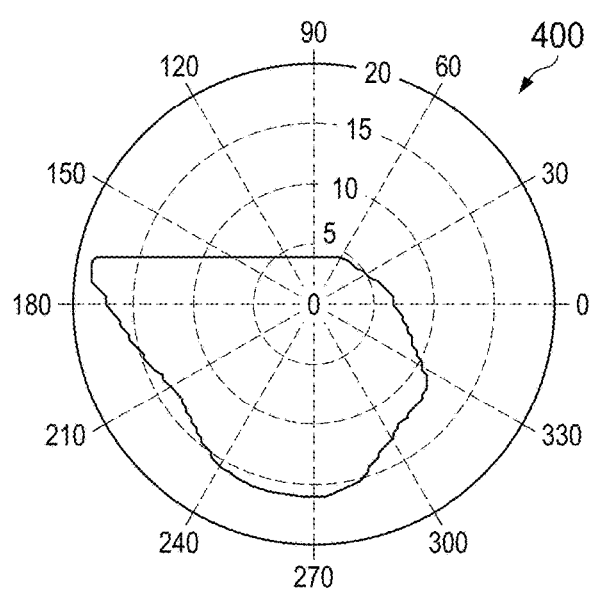
Figure 5:
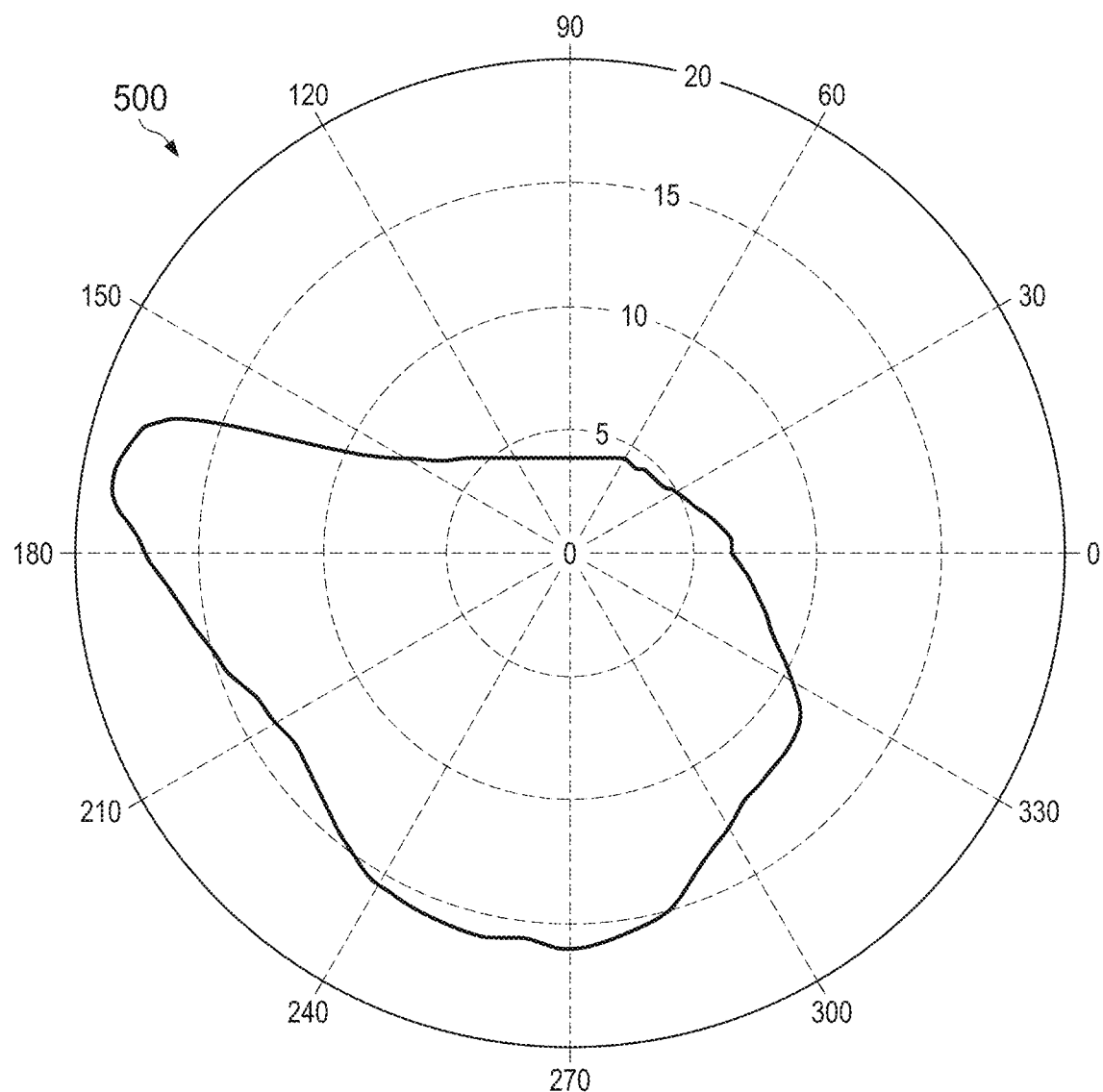
FIG. 5 illustrates example full radial measurements of a CT-scan of a failed borehole as a result of combining the horizontal and the vertical triangulation readings and the spline smoothing step, in accordance with example implementations of this disclosure.

In some implementations, the triangulation process is repeated both vertically and horizontally to provide full readings of the borehole radii as shown in FIG. 4C and FIG. 4D respectively. The number of the radii readings produced is dependent on the number of pixels available, i.e. image resolution, in the CT-scan image. Finally, the vertical and the horizontal radii readings are combined and a smoothing such as a spline smoothing can be applied to the curve to remove irregularities at the pixels corners. An example final result is shown in FIG. 5.

Figure 6A:
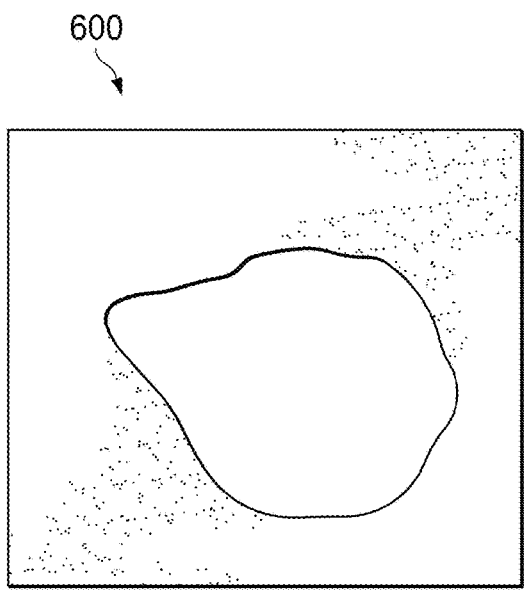
FIG. 6A, FIG. 6B, and FIG. 6C illustrate two example CT-scans and the superimposed radii measurements, in accordance with example implementations of this disclosure.
Figure 6B:
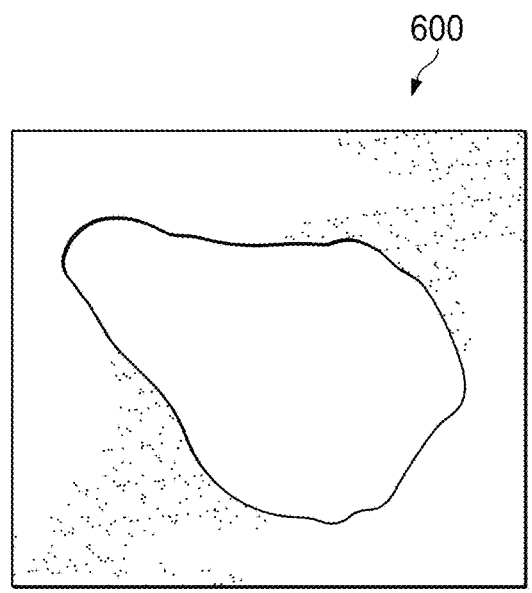
Figure 6C:
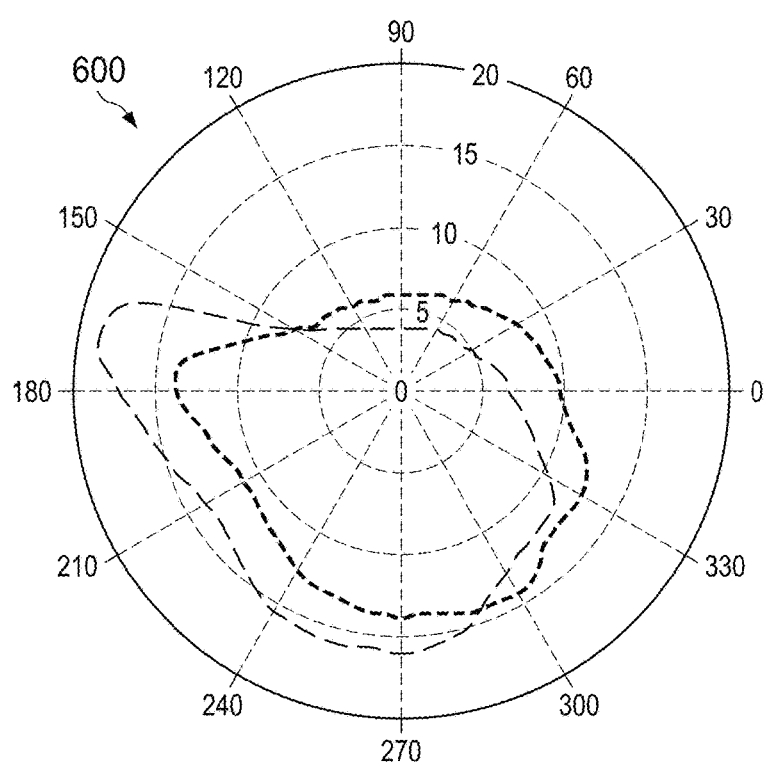
Figure 7:
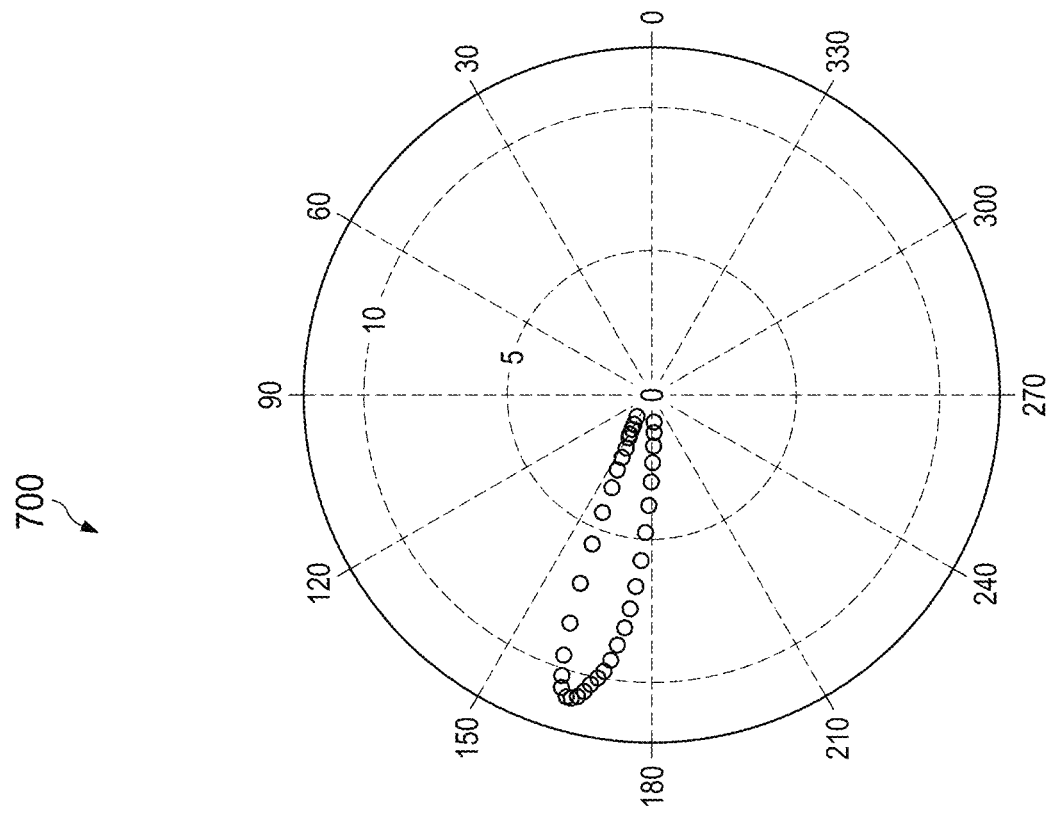
FIG. 7 illustrates an example mapping of the location and magnitude of borehole failure points, in accordance with example implementations of this disclosure.
Figure 7:
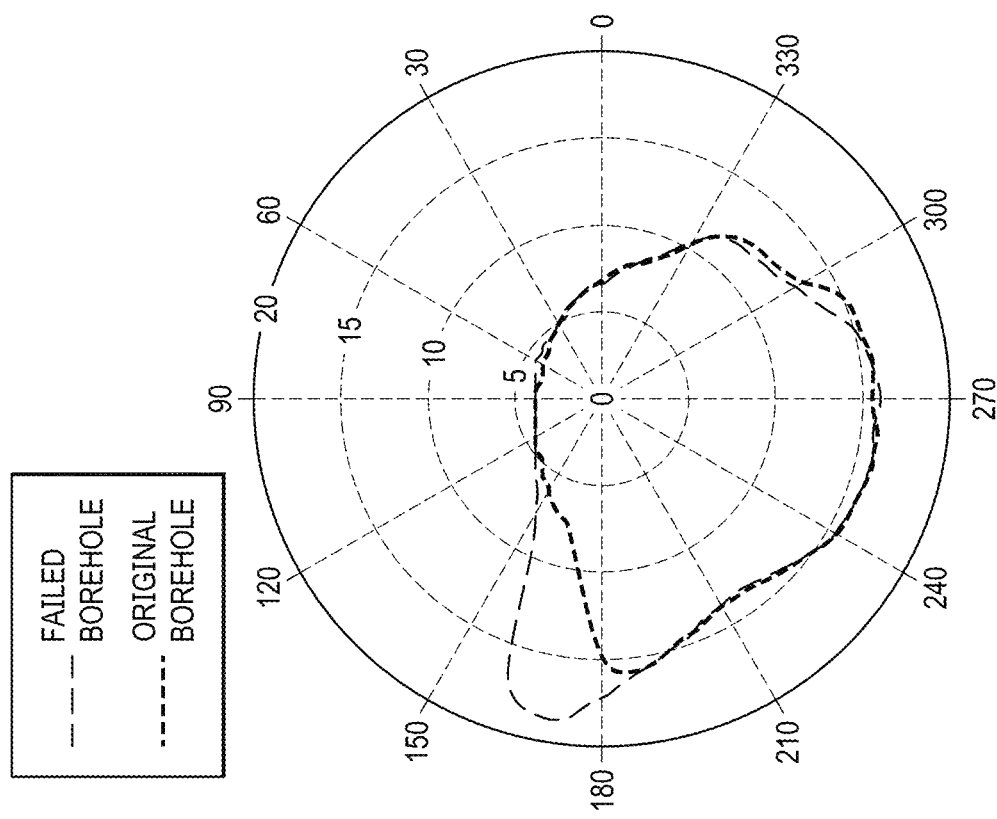

In some implementations, the same process can be repeated for two separate CT-scans to determine the extension of the failure zones from one CT-scan to the other. FIG. 6A, FIG. 6B, and FIG. 6C illustrate two CT-scans and the superimposed radii measurements. FIG. 7 shows the re-positioning of the two CT-scans from FIG. 6C to ensure the area of failure extension is accurately identified. FIG. 7 also shows a mapping of the failure extension zone, where the changes of radial measurements from one CT-scans to the other can be quantified at its specific circumferential location.

Figure 8A:
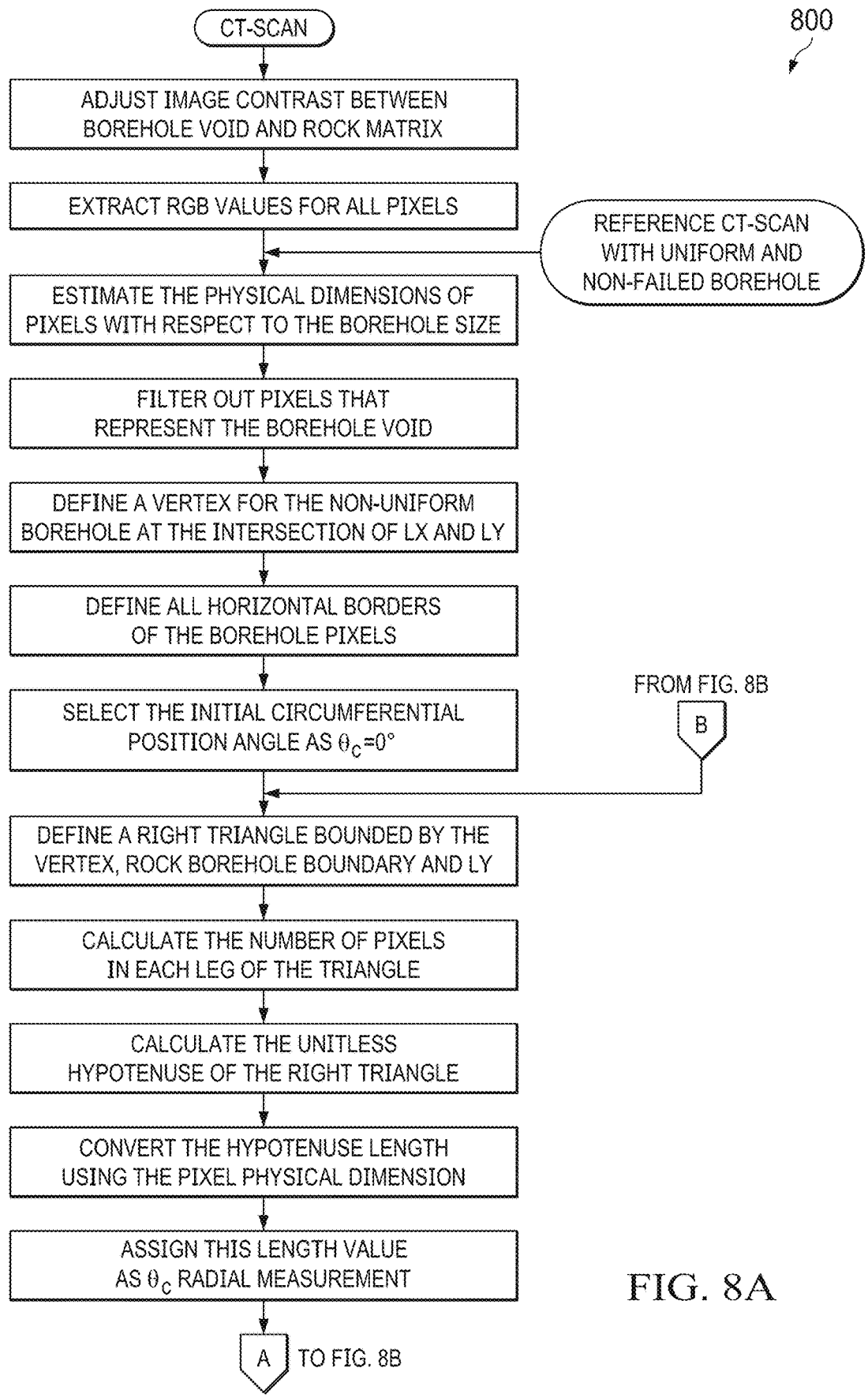
FIG. 8A and FIG. 8B illustrate an example flow chart of a CT-scan borehole interpretation algorithm, in accordance with example implementations of this disclosure.
Figure 8B:
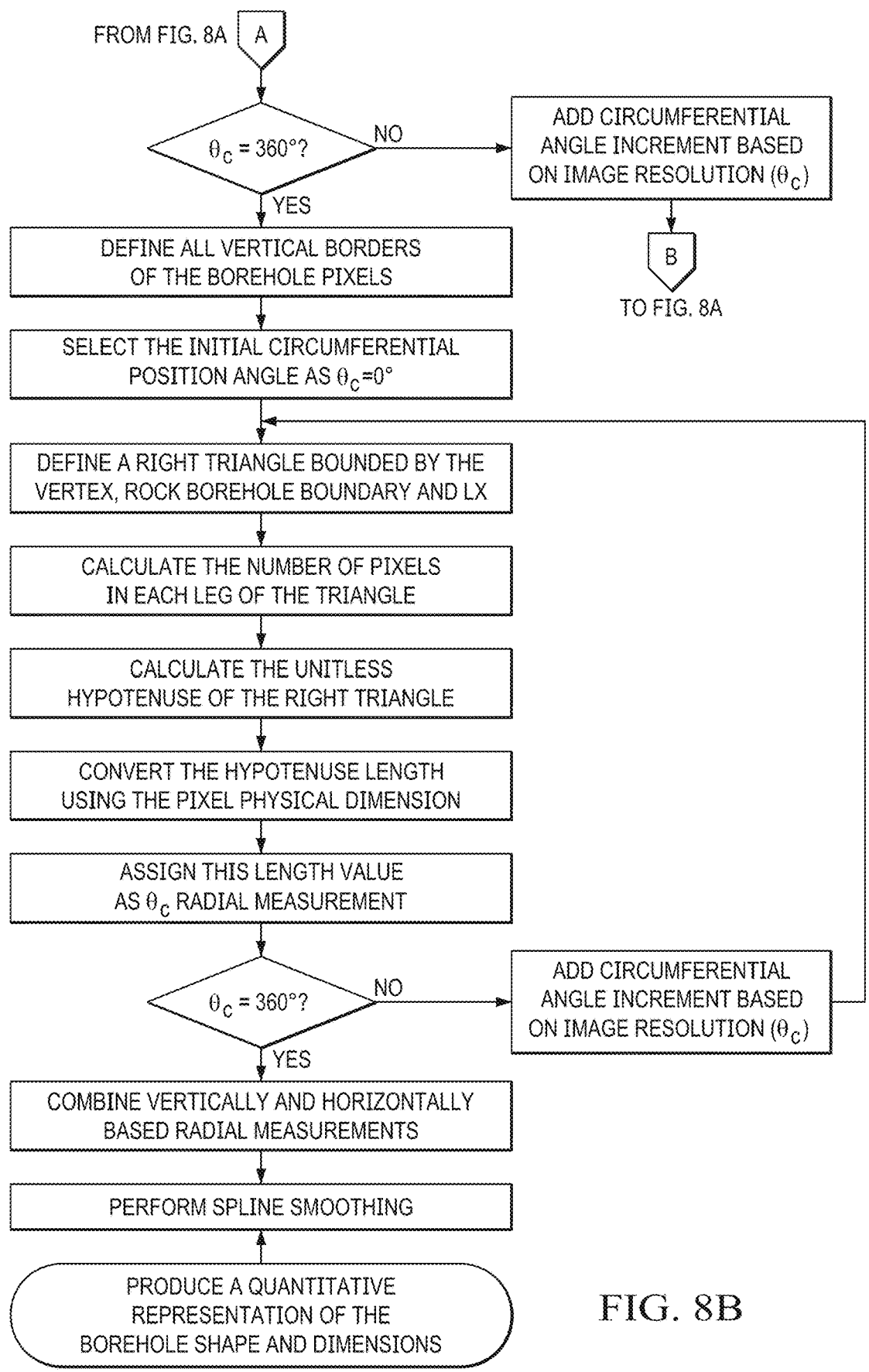

FIG. 8A and FIG. 8B illustrate an example flow chart describing the CT-scan borehole interpretation algorithm.

An example algorithm for field-based ultrasonic log imaging for borehole radial measurements is described next.

In some implementations, this algorithm converts a specific type of image logs, which is ultrasonic based, into caliper readings that cover the 360° of the wellbore circumference. Instead of relying on mechanical caliper logs, which provide radial measurements at only four circumferential angles (0°, 90°, 180°, 270°) in their most common designs, it now relies on images to produce radial measurements at all circumferential angles. As in the case with CT-scans, the resolution of radial measurements is dependent on the image log resolution.

In some implementations, the ultrasonic image logs are preferred for at least two reasons. First, unlike the resistivity-based image logs, ultrasonic images have no gaps, and therefore, can provide a more comprehensive description of the wellbore state. Second, they are available in logging while drilling (LWD) tools in the form of density-based images, therefore they can be used in a real-time setting or a while-drilling setting to feed new information into numerical models.

In some implementations, a difference in the interpretation process between lab-based images (CT-scans) and field-based image logs is that field-based image logs cannot be solely relied on to produce the interpretation. This is mainly due to the challenging environment in which these images are taken. This is also due to variations in image attributes from one commercial logging tool to the other. Therefore field image logs require more support information and validation than lab-based images. The support information used in this application is mechanical caliper log readings. For each image logging tool, the analysis of its images can be calibrated and validated against mechanical caliper measurements taken from the same interval where the images were produced. This ensures that the quantitative assessment of enlargements and tight spots from an image is validated using the mechanical caliper measurements of the same enlargements and tight spots. Once this process is performed, the calibrated algorithm can be used to interpret images from the same logging tool without running a mechanical caliper log every time an image log is produced.

Figure 9:
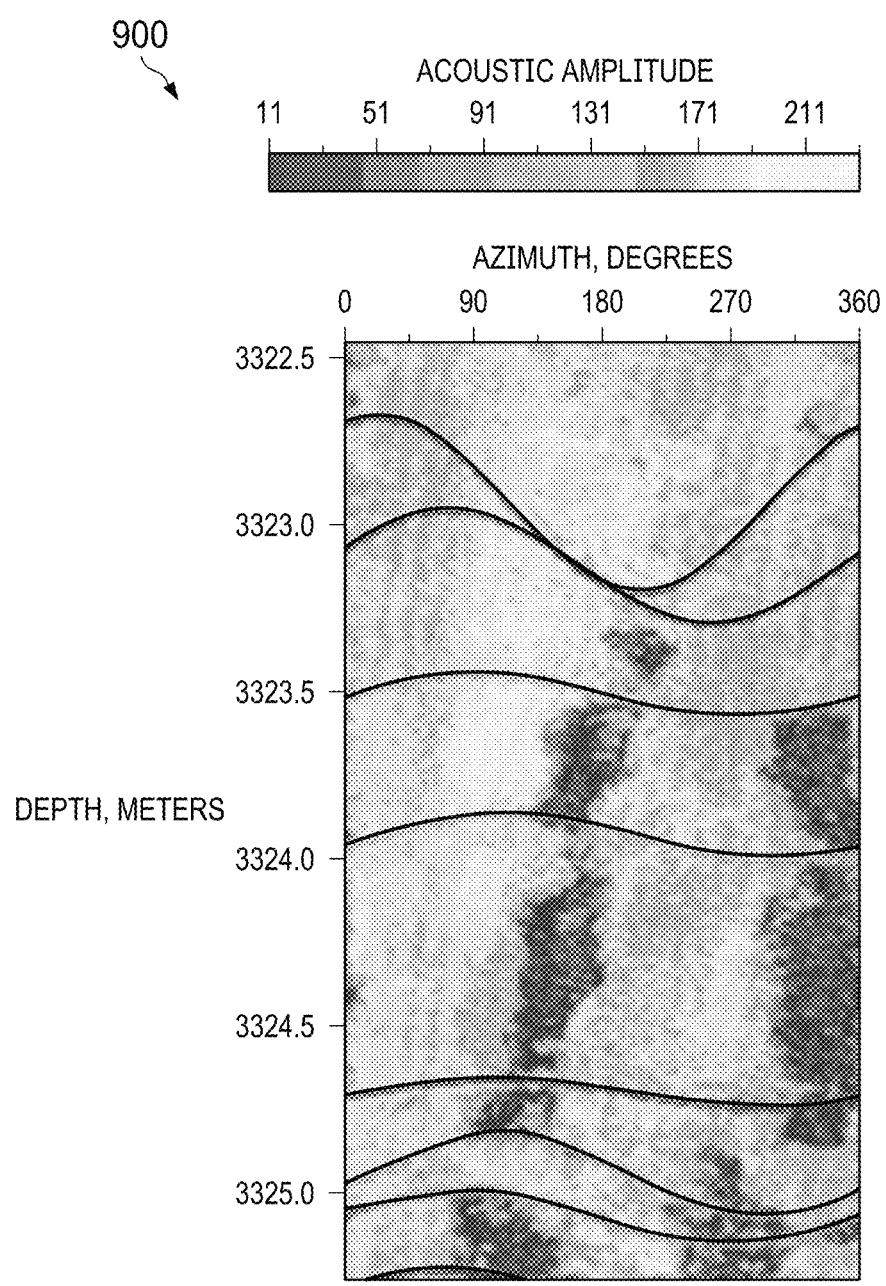
FIG. 9 illustrates an example of an ultrasonic image log from a depth location of a wellbore showing stress-induced wellbore enlargements, in accordance with example implementations of this disclosure.

In some implementations, this process is used for interpreting ultrasonic image logs by converting the RGB color number or values of each pixel to radial measurements. FIG. 9 illustrates an example of an ultrasonic image log. The area highlighted with a box in the middle section of FIG. 9 is the interval that is used to provide an example of an image log interpretation.

Figure 10A:
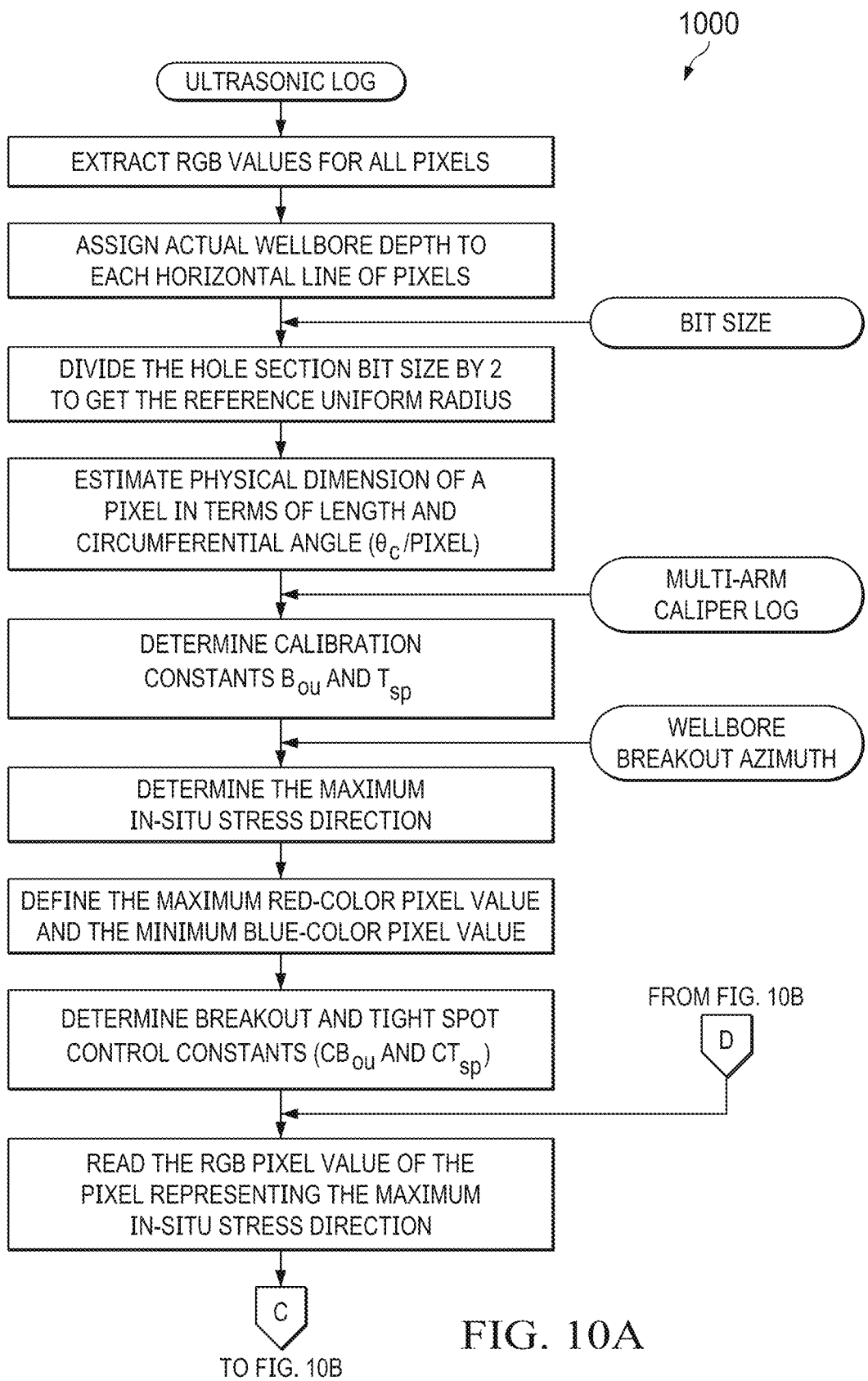
FIG. 10A and FIG. 10B illustrate an example flow chart of an algorithm for calibrating ultrasonic image log interpretations using multi-arm caliper measurements, in accordance with example implementations of this disclosure.
Figure 10B:
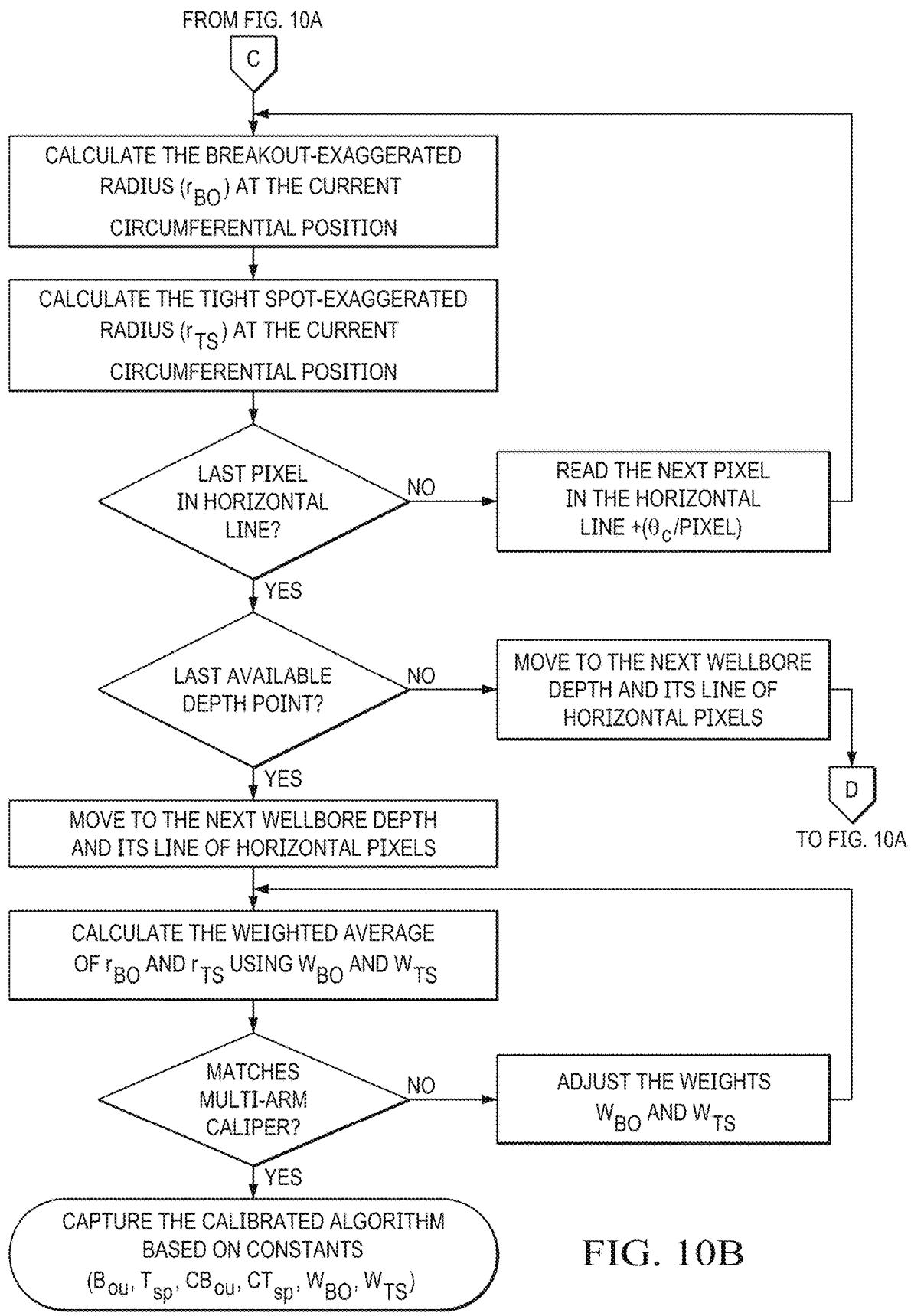

FIG. 10A and FIG. 10B illustrate an example algorithm for calibrating an ultrasonic image log interpretation. In some implementations, this algorithm uses data other than the image log itself to perform the calibration process. These data can be the bit size, multi-arm mechanical caliper log measurements, and a definition of the direction of the maximum in-situ stress. The bit size is used to assign physical dimension to an individual pixel size. The maximum in-situ stress direction is employed so that it can be correlated with the direction of wellbore enlargements or breakouts as observed in the image. The multi-arm mechanical caliper log measurements can be used to ascertain the extent of the radial depth of a darkly-colored breakout zone such as the ones shown as black in FIG. 9. They can also be used to ensure correct interpretation of tight spots, which are characterized by bright spots (shown as white in FIG. 9) on the log and a radius that is smaller than that of the bit size. This step determines $B_{ou}$ and $T_{sp}$, which are the breakout and the tight spot calibration constants respectively. The next step in the algorithm described in FIG. 10A is to extract the maximum red-color pixel value and the minimum blue-color pixel value. These two values can be used to determine the breakout and tight spot control constants ($CB_{ou}$ and $CT_{sp}$) as follows:

$$CB_{ou} = \frac{\text{Bit size}}{\text{Maximum red color pixel value}}, \text{ and}$$

$$CT_{sp} = \frac{\text{Bit size}}{\text{Minimum blue color pixel value}}.$$

$CB_{ou}$ and $CT_{sp}$ can be correlated to the identification of the most darkly colored region (shown as black in FIG. 9) in the image (which represents the deepest breakout) and the most brightly colored region (shown as white in FIG. 9) in the image (which represents the tightest spot in the hole). These constants, along with the calibration constants, can be used to calculate the breakout-exaggerated radii ($r_{BO}$) and the tight spot exaggerated-radii ($r_{TS}$) as follows:

$r_{BO} = B_{ou}(\text{Bit size}-(\text{Red}_i \times CB_{ou})) + \text{Bit size}$, and $r_{BO} = B_{ou}(\text{Bit size}-(\text{Red}_i \times CB_{ou})) + \text{Bit size}$, where $\text{Red}_i$ and $\text{Blue}_i$ are the maximum and minimum values for all pixels in a single horizontal line which defines the borehole full circumference. The final step is the calculation of a weighted average between $r_{BO}$ and $r_{TS}$ as follows:

$$\text{Radius} = W_{BO} \times r_{BO} + W_{TS} \times r_{TS}$$

where W_BO and W_TS are the average weights, which are determined through a trial and error process that involves matching the weighted average with the actual multi-arm mechanical caliper log measurements as shown in FIG. 8A and FIG. 8B. This calibration algorithm needs to be applied to each unique image logging tool to ensure that the images produced from the tool are correctly interpreted. The same process may potentially need to be repeated for a calibrated tool when it is run in a new environment.

Figure 11A:
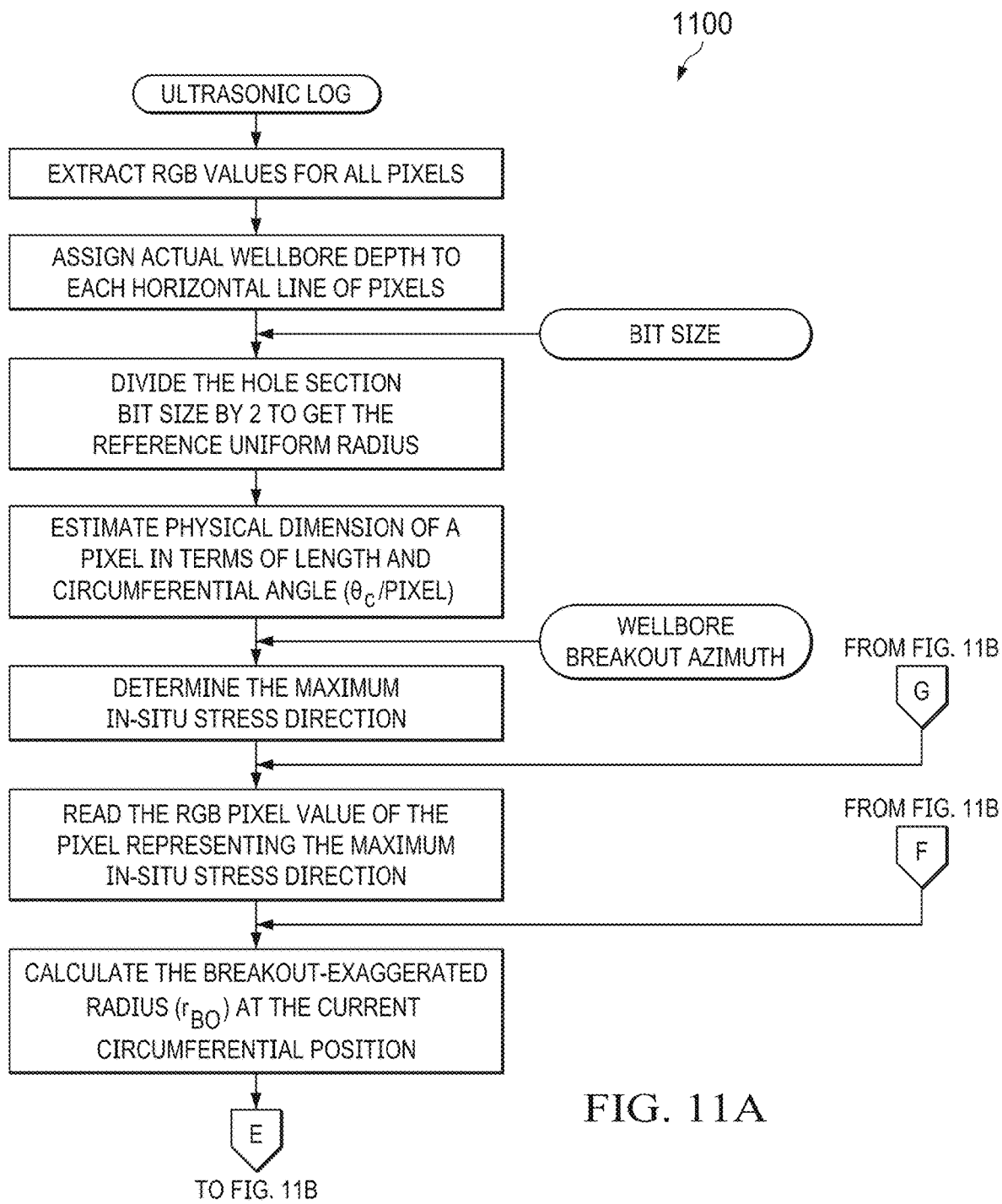
FIG. 11A and FIG. 11B illustrate an example flow chart of an algorithm for applying the calibrated ultrasonic image log model, in accordance with example implementations of this disclosure.
Figure 11B:
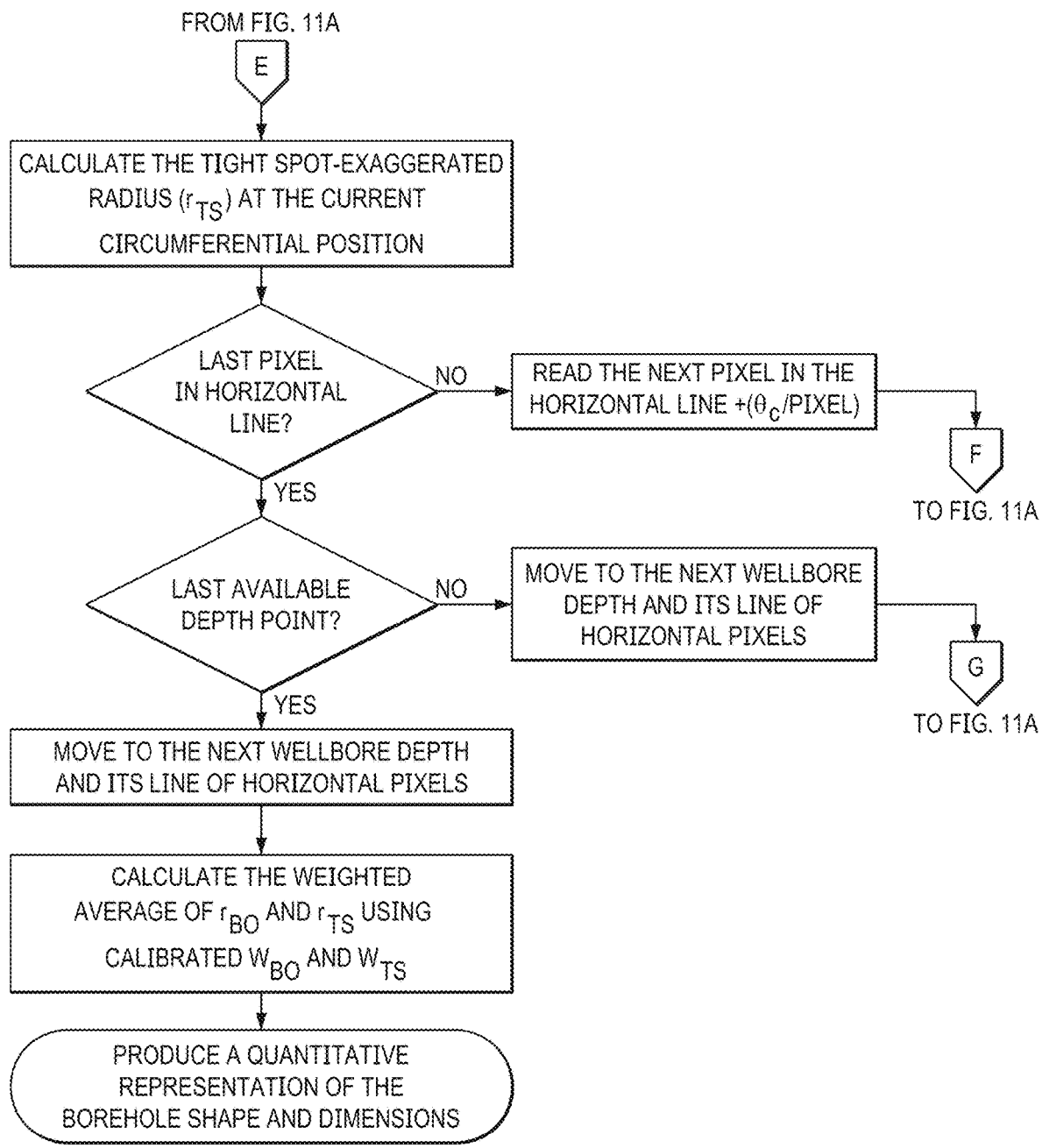

In some implementations, once the calibration algorithm is applied to a certain imaging tool, the image produced by this tool in new hole sections or new wells can be interpreted to produce a full 360° radial measurements by utilizing the algorithm described in FIG. 11A and FIG. 11B.

Figure 12:
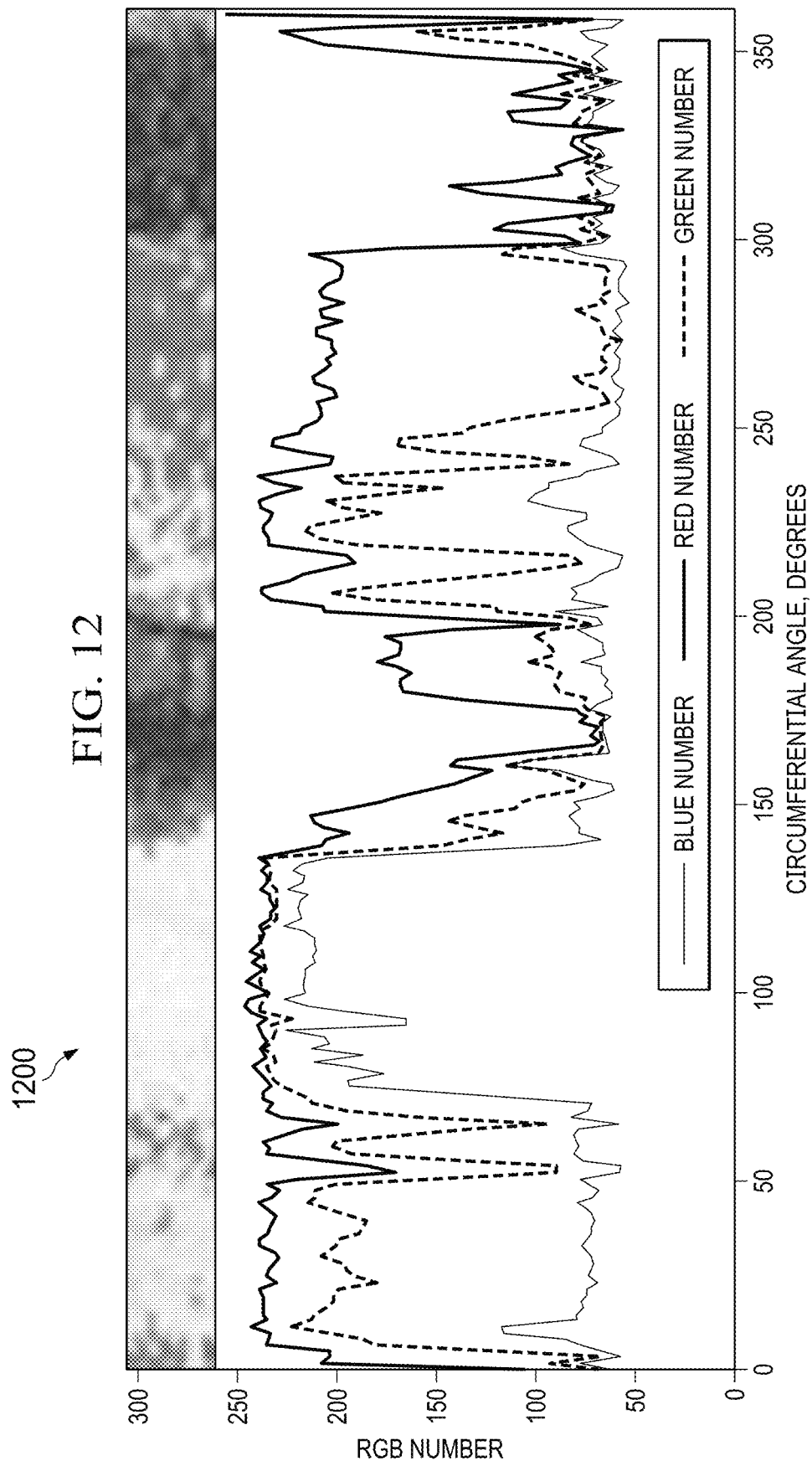
FIG. 12 illustrates an example plot of the RGB numbers from an ultrasonic image log showing a correlation between the location of enlargements in the image and the trends in the RGB numbers, in accordance with example implementations of this disclosure.

FIG. 12 and FIG. 13 illustrate the results of the interpretation of the ultrasonic image log in FIG. 9. FIG. 12 illustrates the correlation between the RGB number and the placement of enlargements and tight spots. This correlation can be used along with calibrating values from a mechanical multi-arm caliper log to calculate the radial measurements of the wellbore at different directions. In some implementations, the number of radial measurements produced is dependent on the number of pixels available in the image log (i.e. image resolution). In the example shown in FIG. 12, the image log has resolution of 221 pixels per the 360° degrees around the wellbore, which equates to about one radius measurement for each 1.63° degrees around the circumference of the wellbore. FIG. 13 illustrates the final results of the image log interpretations that are calibrated with mechanical caliper log readings in both Cartesian and polar coordinates. When comparing the ultrasonic image log interval in FIG. 9 to the interpreted radial measurements in FIG. 13, it can be seen that the dark regions in the image that signify the presence of wellbore enlargements are also reflected as radial measurements that are higher than the bit radius.

An example algorithm for field-based resistivity log imaging for borehole radial measurements is described next.

In some implementations, this algorithm converts this type of image logs into caliper readings that cover the 360° of the wellbore. The main difference between sonic-based images and resistivity-based images is that resistivity images normally contain several gaps due to the space between the electrical pads of the resistivity image logging tool. Resistivity based image logs also differ from sonic-based images in the way a breakout (or wellbore enlargement) can be identified. In sonic images, changes in color are sufficient, however, in resistivity images, changes in color alone can be misleading as they can signify laminations, faults, natural, and induced fractures along with breakouts. This means that resistivity logs are efficient indicators of 'physical features' within the wellbore, but they are poor indicators of the spatial (specifically, radial) extension of these physical features. Fortunately, there's one distinguishing feature of breakouts in resistivity logs which is the lowered resolution of the image at that breakout orientation. The lower resolution at breakouts is due to the electrical pad of the logging tool being further away from the wellbore wall when the resistivity image measurements are taken. This change in color resolution is exploited in this image interpretation algorithm to identify the orientation of breakouts, still, it's not sufficient to assess the extent of the enlargement. For this issue, provided multi-arm caliper readings are used to correlate the radial extent at every location in the wellbore. The pixels RGB readings are feature scaled using the following formula to yield the needed radii:

$$\text{Scaled } RGB = CAL_{min} + \left(\frac{RGB_{adj} - RGB_{min}}{RGB_{max} - RGB_{min}}(CAL_{max} - CAL_{min})\right),$$

where $CAL_{min}$ and $CAL_{max}$ are minimum and maximum multi-arm mechanical caliper radius readings respectively, which are used for calibration. $RGB_{adj}$ is the adjusted RGB reading for filtering out noise and white gaps in the image. Using this method in interpreting image logs means that the availability of multi-arm caliper data is a necessity when resistivity images are used, which also means this analysis can't be done in real-time. This is to be expected since conventional resistivity-based image logs are not available through LWD in the same manner as density-based images.

Figure 14:
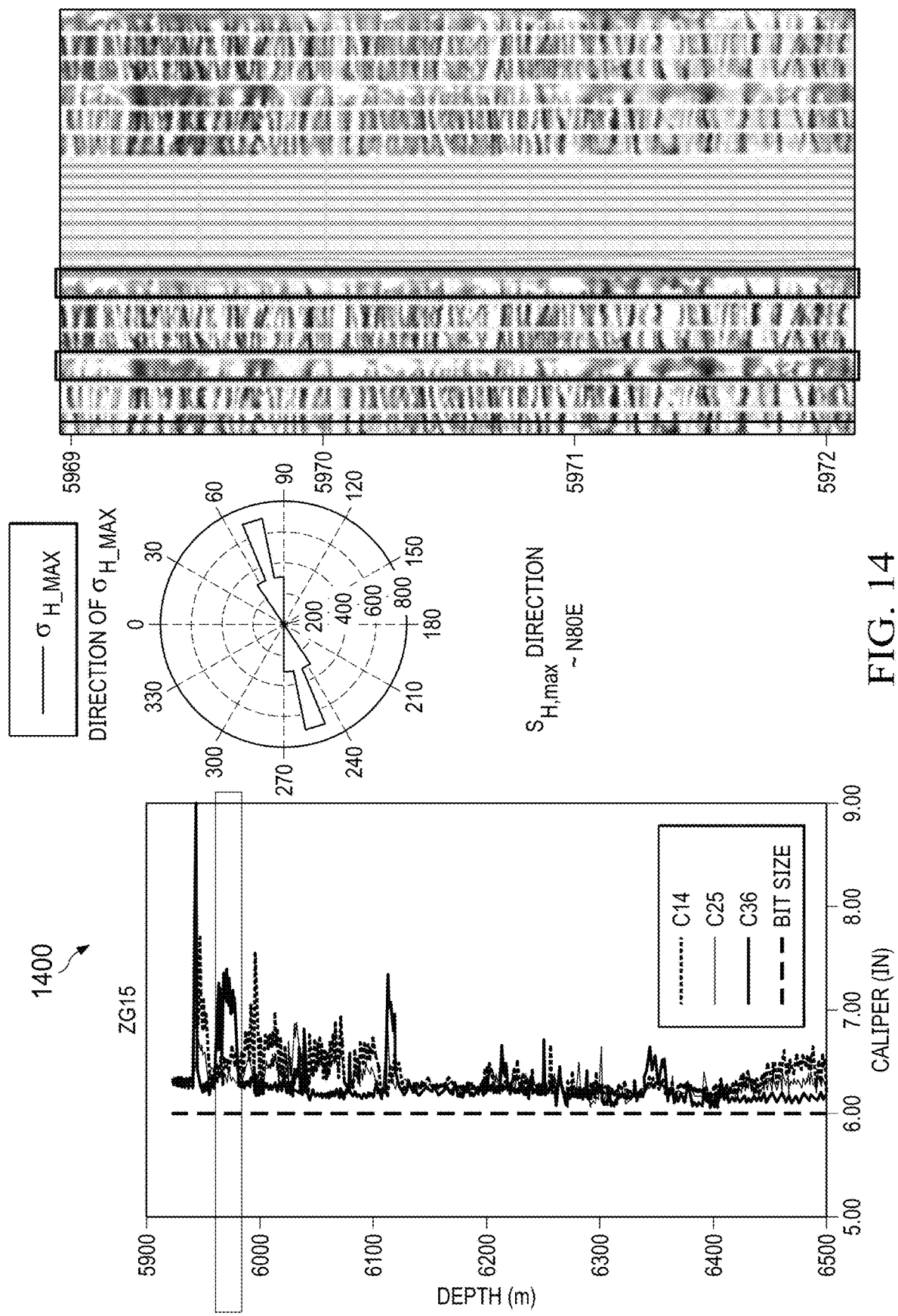
FIG. 14 illustrates example mechanical multi-arm caliper log readings and corresponding resistivity-based image log, in accordance with example implementations of this disclosure.

FIG. 14 illustrates an example of a resistivity image log along with mechanical caliper log readings. The regions highlighted in the two boxes in the image log to the right are the low-resolution areas that signify the presence of wellbore enlargements. The area highlighted with a box in the mechanical caliper log to the left is the interval from which the image log to the right was taken.

Figure 15A:
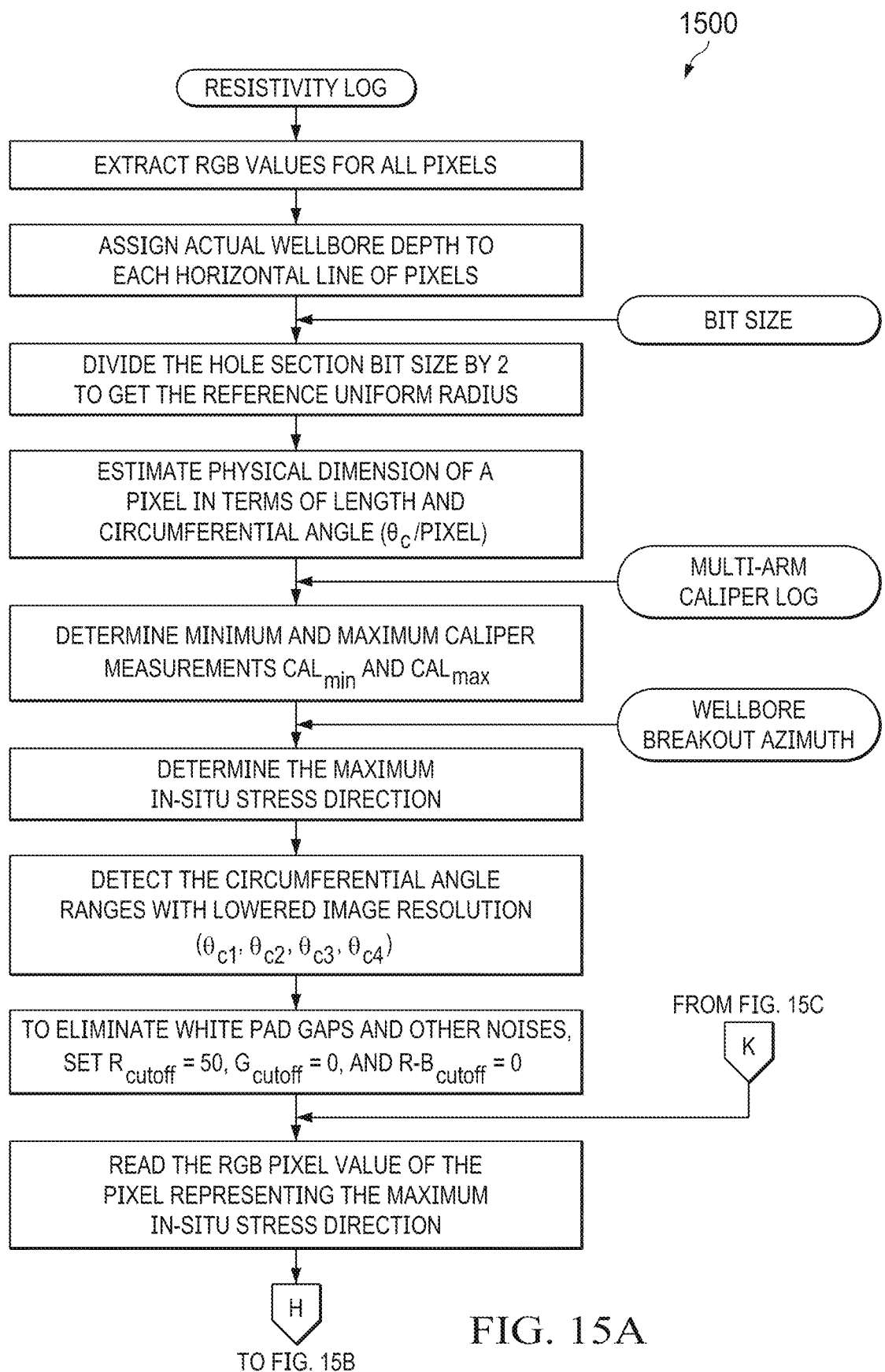
FIG. 15A, FIG. 15B, and FIG. 15C illustrate an example flow chart of an algorithm for producing interpretations from resistivity image logs, in accordance with example implementations of this disclosure.
Figure 15B:
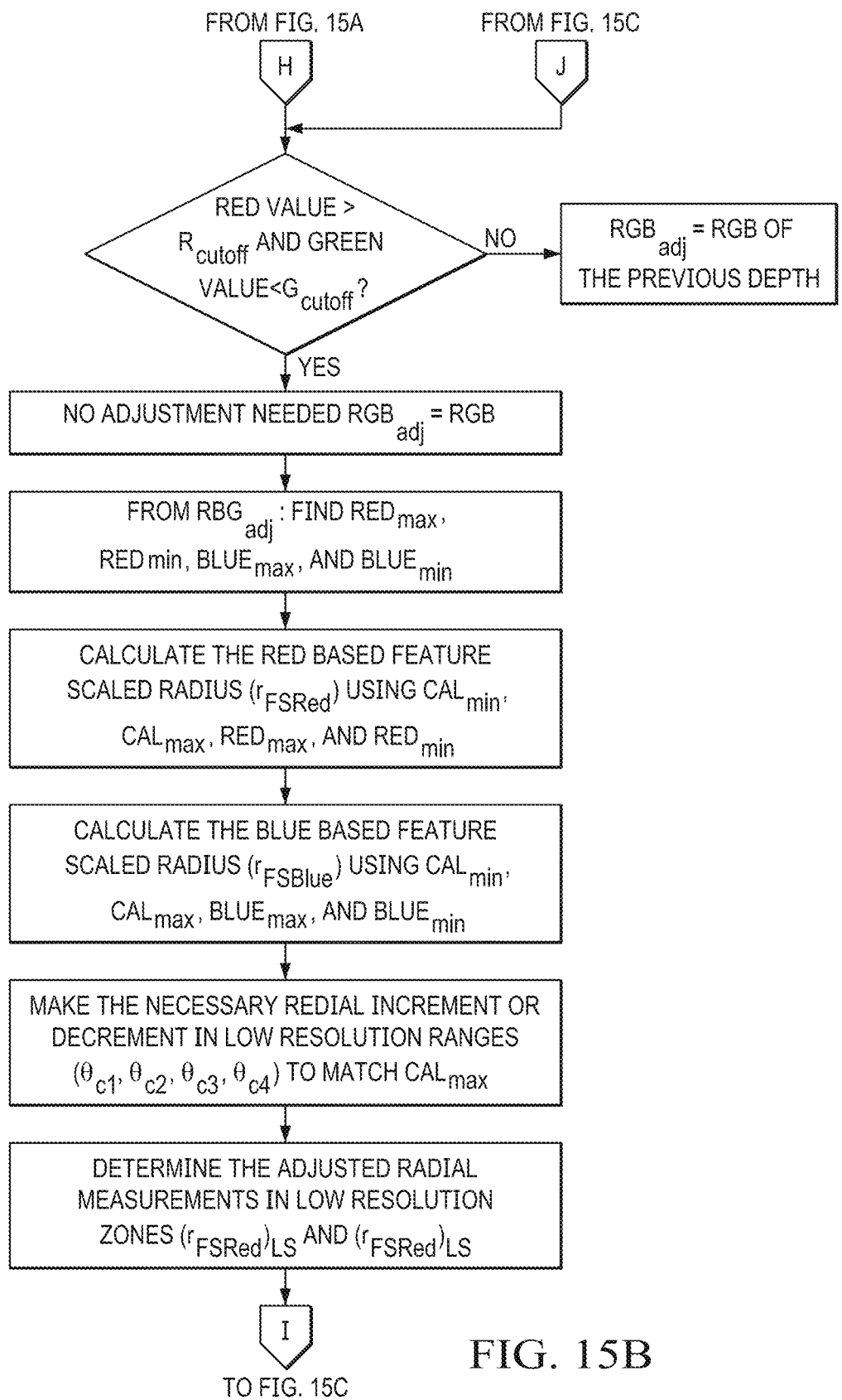
Figure 15C:
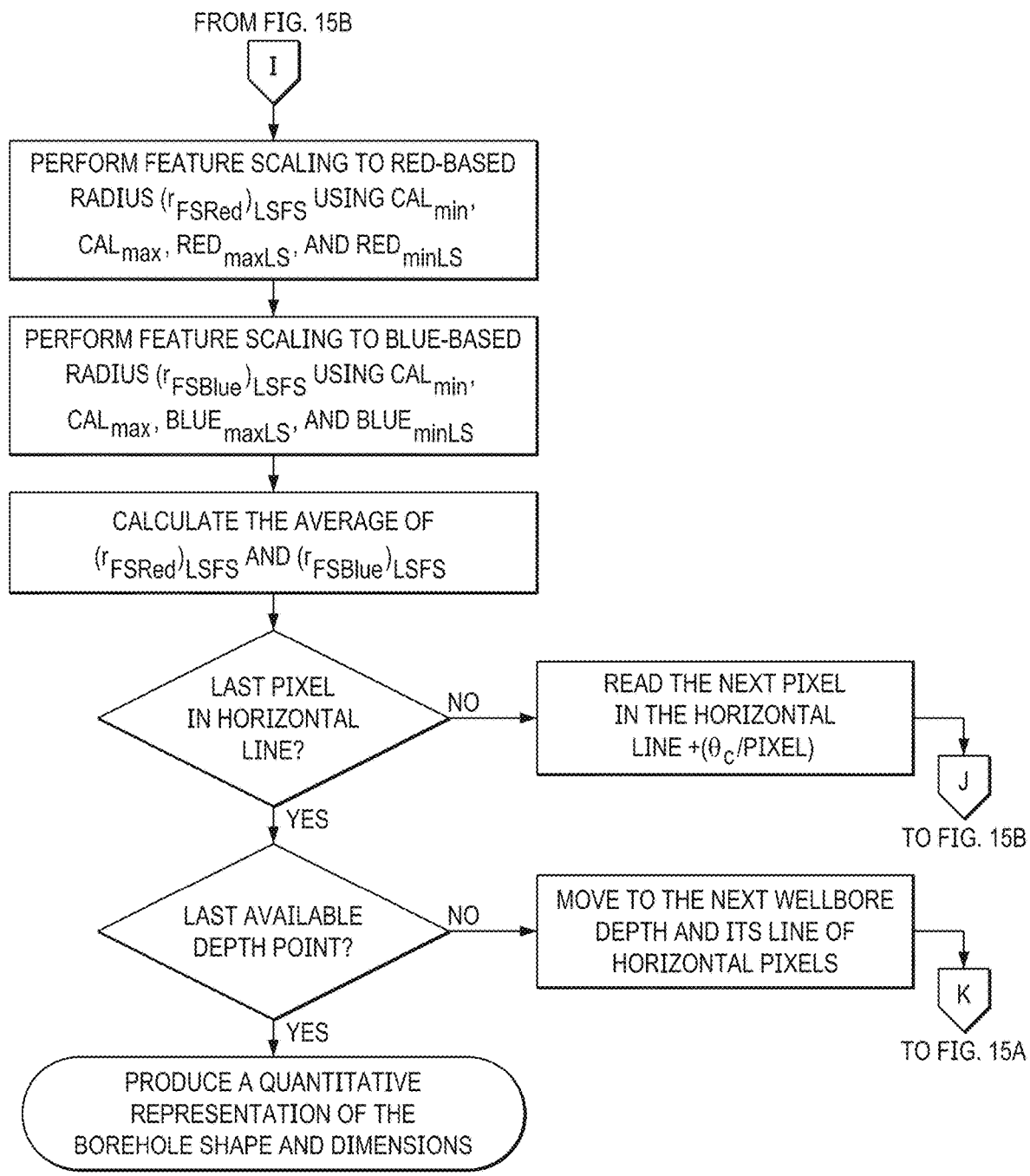

FIG. 15A, FIG. 15B, and FIG. 15C illustrate an example flow chart of the algorithm for interpreting resistivity-based image logs. In some implementations, this algorithm uses data other than the image log itself to perform the interpretations process. These data can be the bit size, multi-arm mechanical caliper log measurements, and a definition of the direction of the maximum in-situ stress. The low-resolution zones can be defined using the circumferential angle ranges $(\theta_{c1}, \theta_{c2}, \theta_{c3}, \theta_{c4})$ where 1 and 2 define the starting and final angle of the first zone while 3 and 4 define the rage for the second zone. The RGB values can be adjusted to produce $RGB_{adj}$ for the purpose of filtering out noise and white gaps in the image. This adjustment process can use an upper cutoff value of 0 for each pixel green color value ($G_{cutoff}$), a lower value of 50 for each pixel red color value ($R_{cutoff}$), and a lower value of 0 for the subtraction of blue from red color values ($R-B_{cutoff}$).

Figure 16:
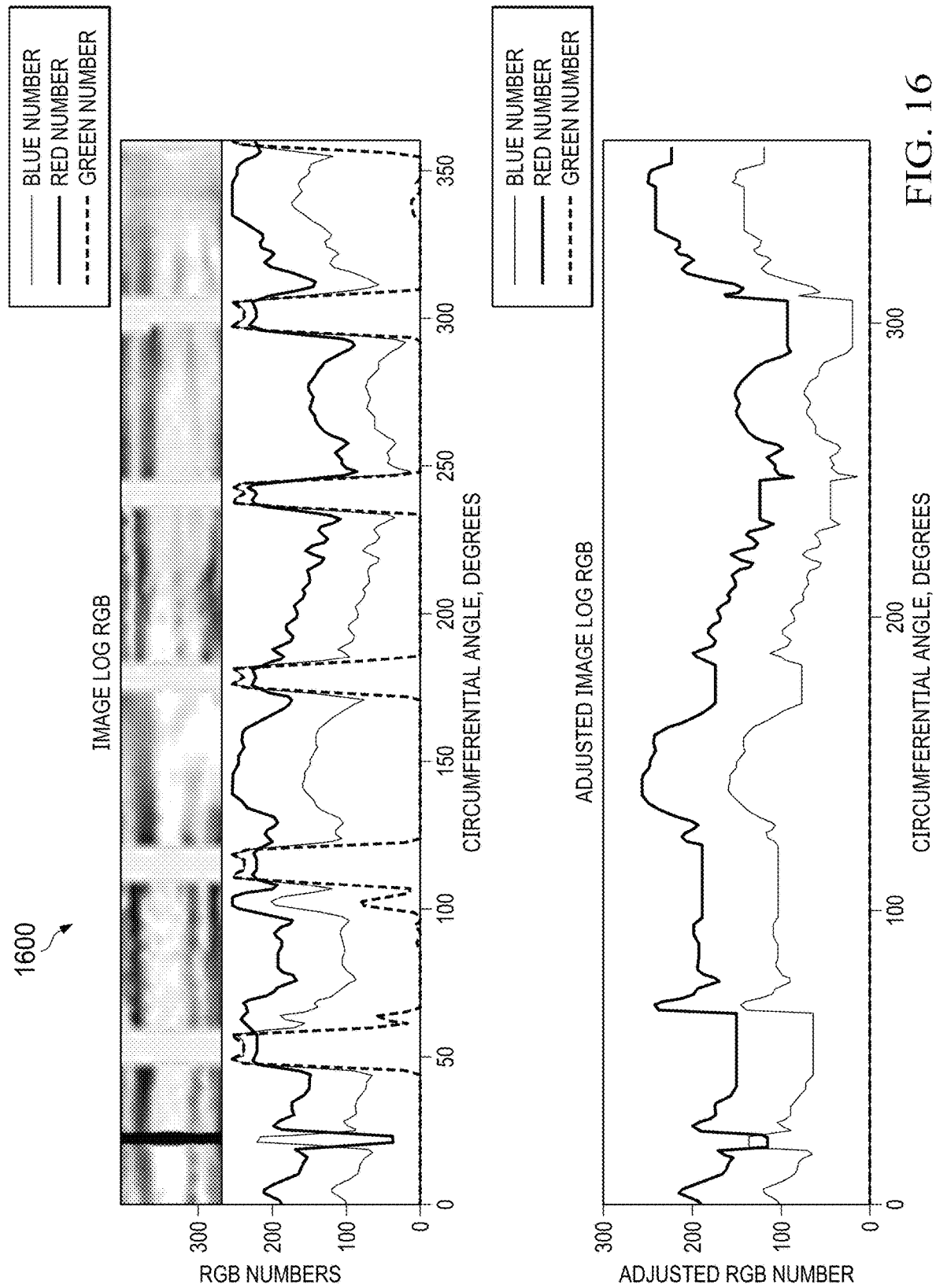
FIG. 16 illustrates an example original RGB number of an resistivity image log and the adjusted RGB values to account for the image gaps and other image noise, in accordance with example implementations of this disclosure.

FIG. 16 illustrates the original RGB number of the resistivity image log from FIG. 14 and the adjusted RGB values to account for the image gaps and other image noise. FIG. 17 illustrates the final results of the image log interpretations that are calibrated with mechanical caliper log readings in both Cartesian and polar coordinates. When comparing the resistivity image log interval in FIG. 14 to the interpreted radial measurements in FIG. 17, it can be seen that the low resolution regions in the image that signify the presence of wellbore enlargements are also reflected as radial measurements that are higher than the bit radius. Also, when examining the mechanical caliper readings in the interval highlighted in red to the left in FIG. 14, it can be seen that there is an agreement that the wellbore is fully enlarged at different directions.

An example algorithm for converting borehole radial measurements to 3d numerical model mesh is described next.

Figure 18A:
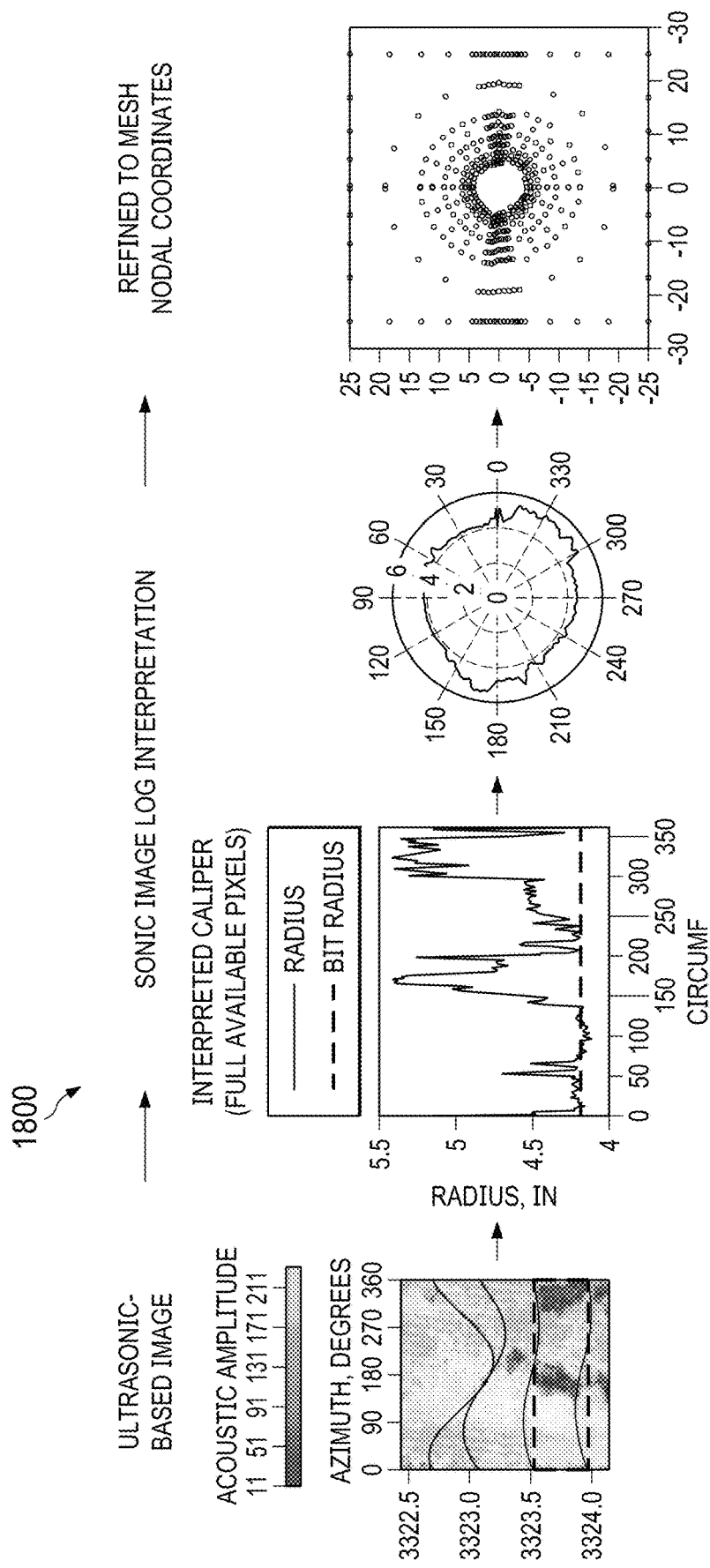
FIG. 18A, FIG. 18B, and FIG. 18C illustrate an example process of converting the borehole shape interpretations from field and lab images into a mesh nodal coordinate, in accordance with example implementations of this disclosure.
Figure 18B:
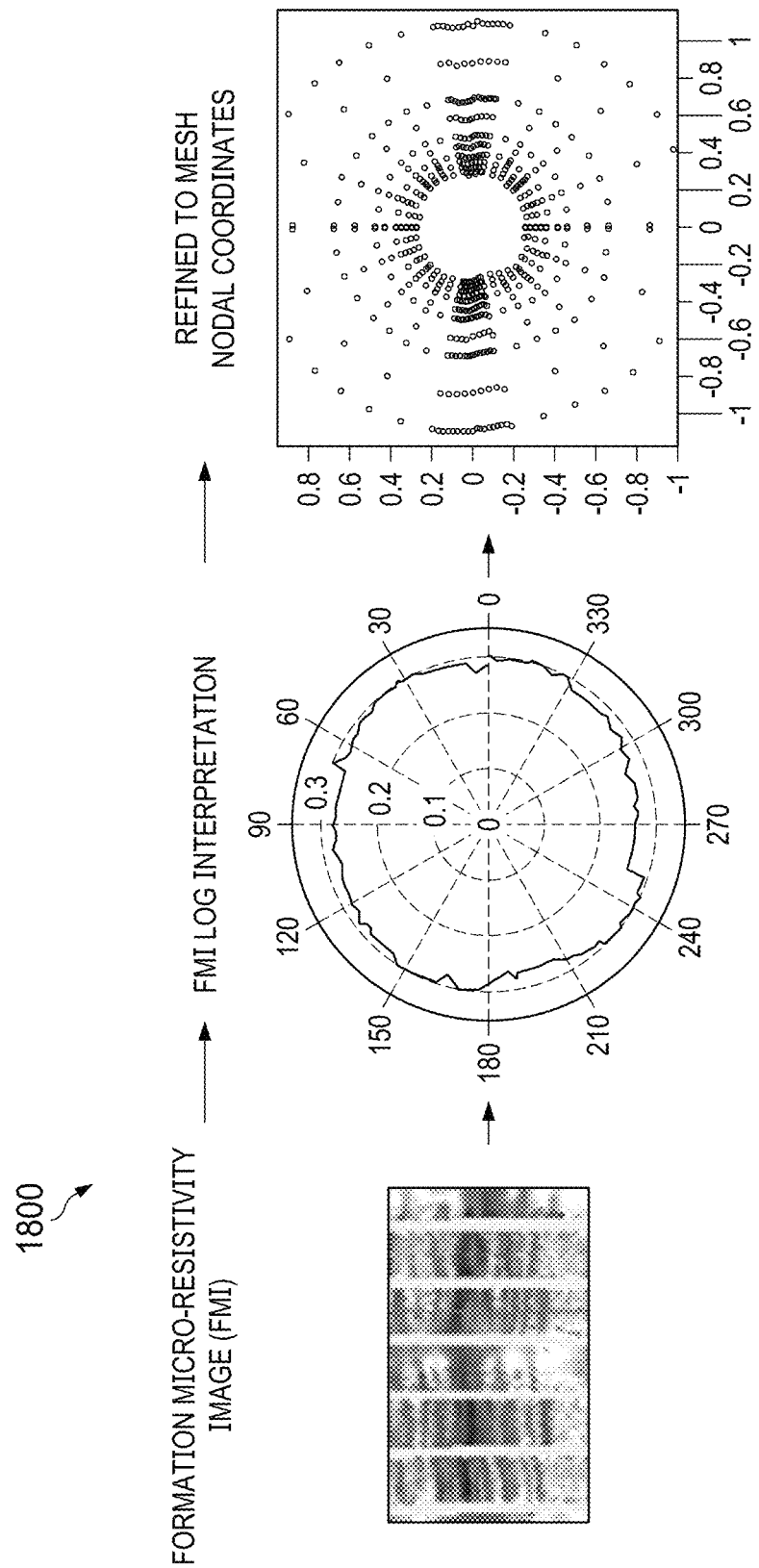
Figure 18C:
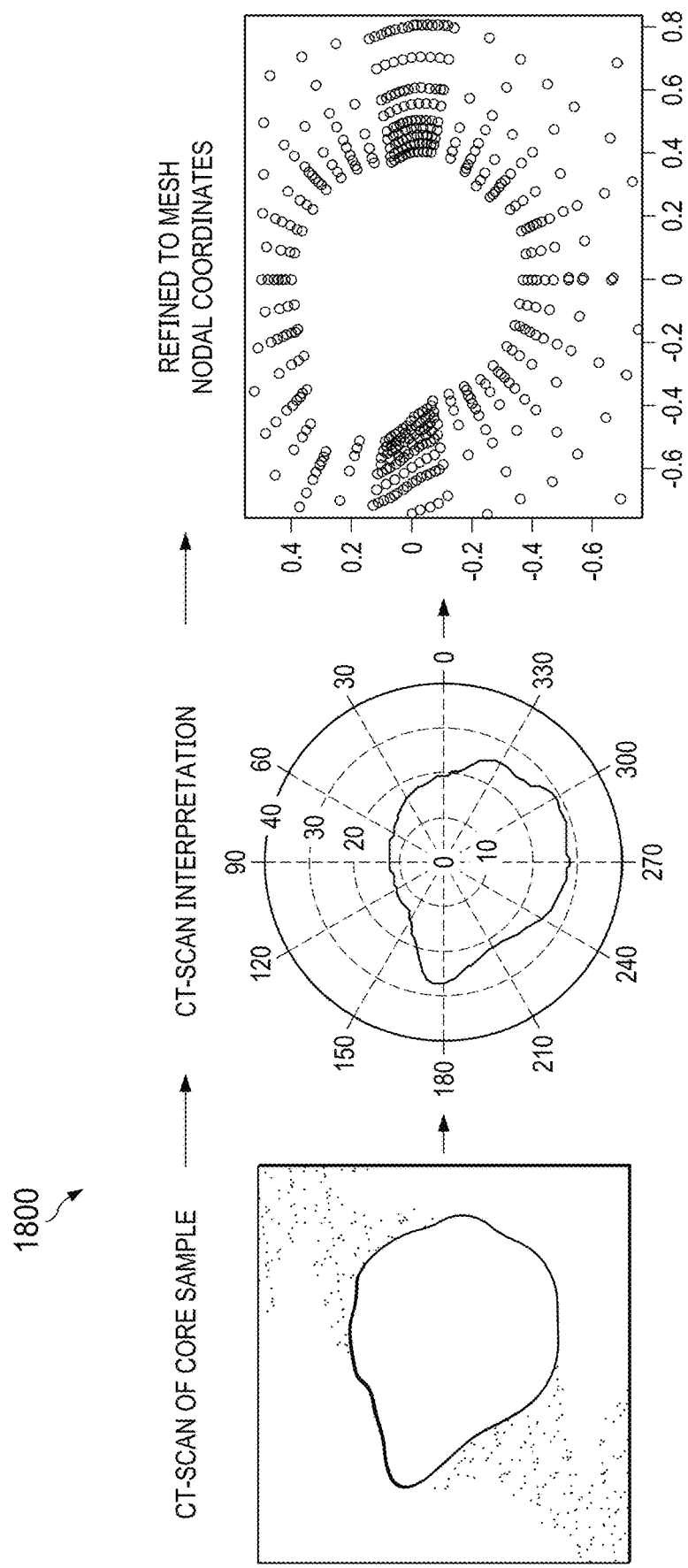

In some implementations, once the radii measurements of a borehole are produced by the image analyzer algorithms described in the previous sections (for CT-scans, ultrasonic image logs, and resistivity image logs), the meshing function can receive these measurements and calculates the nodal coordinates of the mesh based on them. This can be done by assigning a separate borehole radius measurement to each circumferential angle around the borehole. Then, the coordinates of each single line of nodes associated with each circumferential angle can be calculated with consideration of whether the line of nodes is placed at the center or at the boundary of an element in the mesh. This process is repeated for each radial line of nodes at all the specified vertical layers until the full coordinates describing the borehole or the wellbore and the formations it penetrates is fully calculated. The meshing function can perform this process based on lab images, CT-scans, ultrasonic image logs, and resistivity image logs as shown in FIG. 18A, FIG. 18B, and FIG. 18C.

Figure 19:
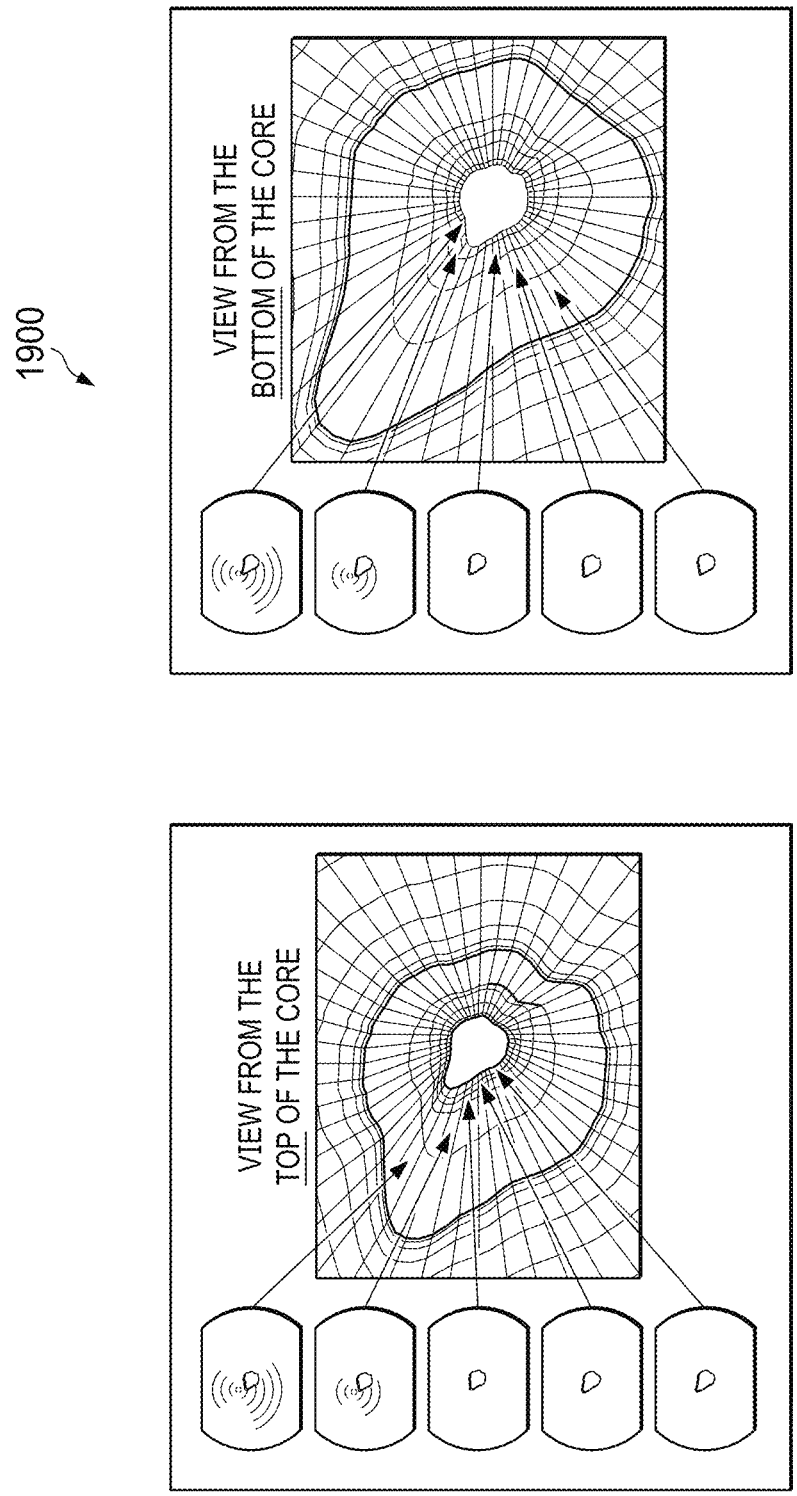
FIG. 19 illustrates an example meshing function ability to reflect different borehole shapes based on CT-scan taken across different cross-sections of the core sample, in accordance with example implementations of this disclosure.

In some implementations, this meshing function can also reflect the variation of the borehole shape along the axis of the borehole. For core samples, the mesh function reflects the different borehole shapes as described by CT-scans that are taken at different cross-sections of the core. The same goes for field-based images as the mesh can reflect the different shapes of the wellbore as described by the image log across different depths of the wellbore. An illustration of this function based on CT-scans is shown in FIG. 19.

Figure 20:
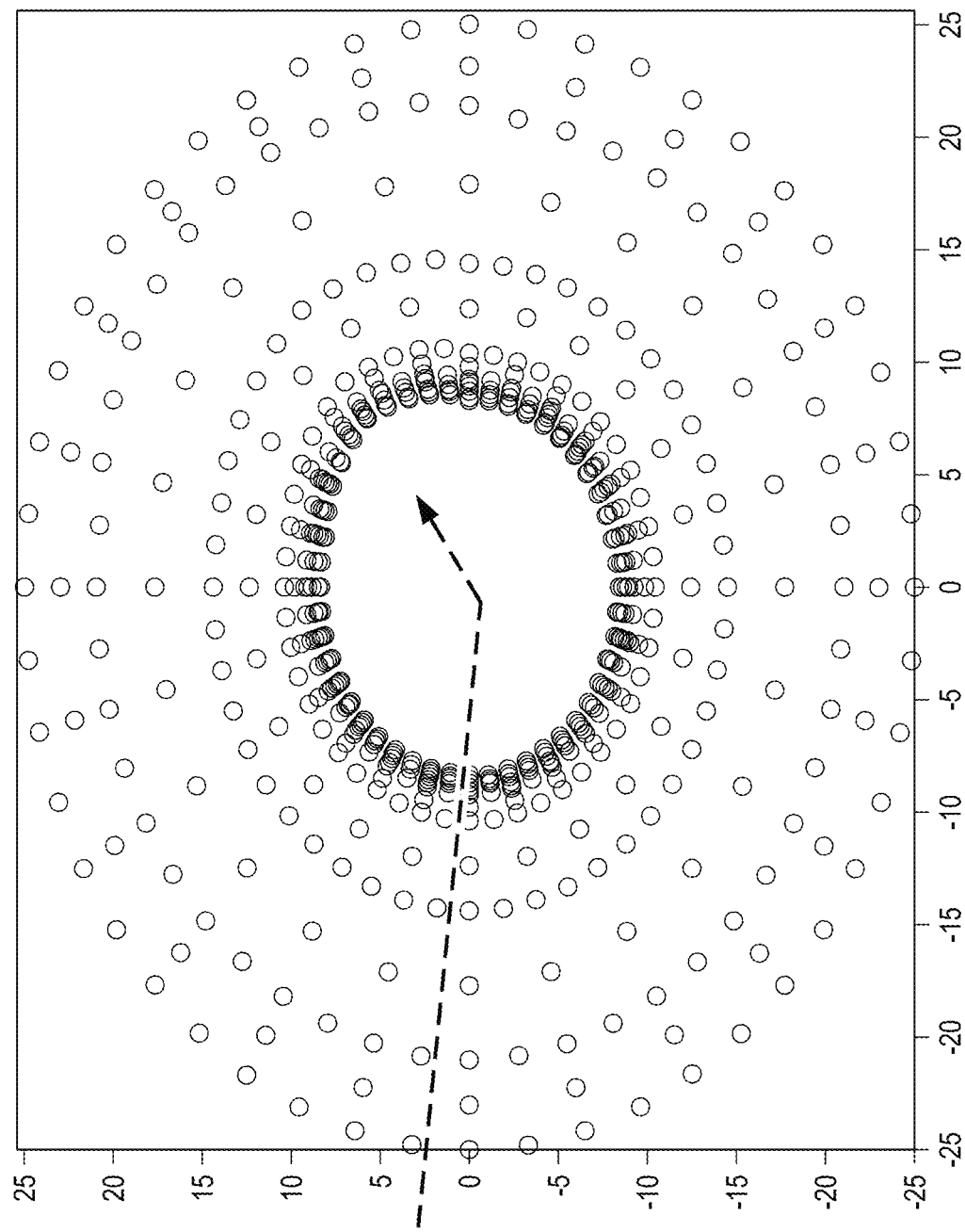
FIG. 20 illustrates an example definition of key-seating and the results of the meshing function, in accordance with example implementations of this disclosure.
Figure 20:
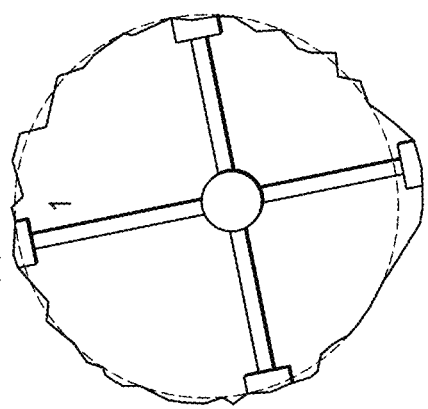
Figure 20:
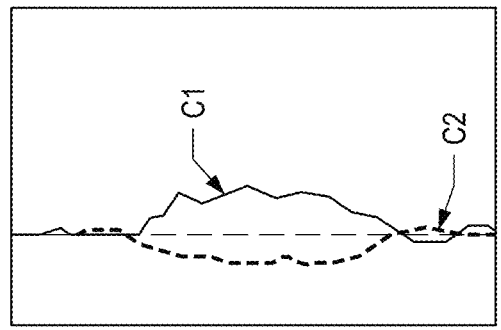

In some implementations, this meshing function can also reflect different wellbore features, and this is specific to field-based (as opposed to lab-based) images. One wellbore feature can be key-seating, which is the enlargement of one side of the wellbore due to having the drillstring rest on that side. The meshing function can reflect the dimensions of the key-seat enlargement on the coordinate of the wellbore. An illustration of an example definition of key-seating and the results of the meshing function are shown in FIG. 20.

Figure 21:
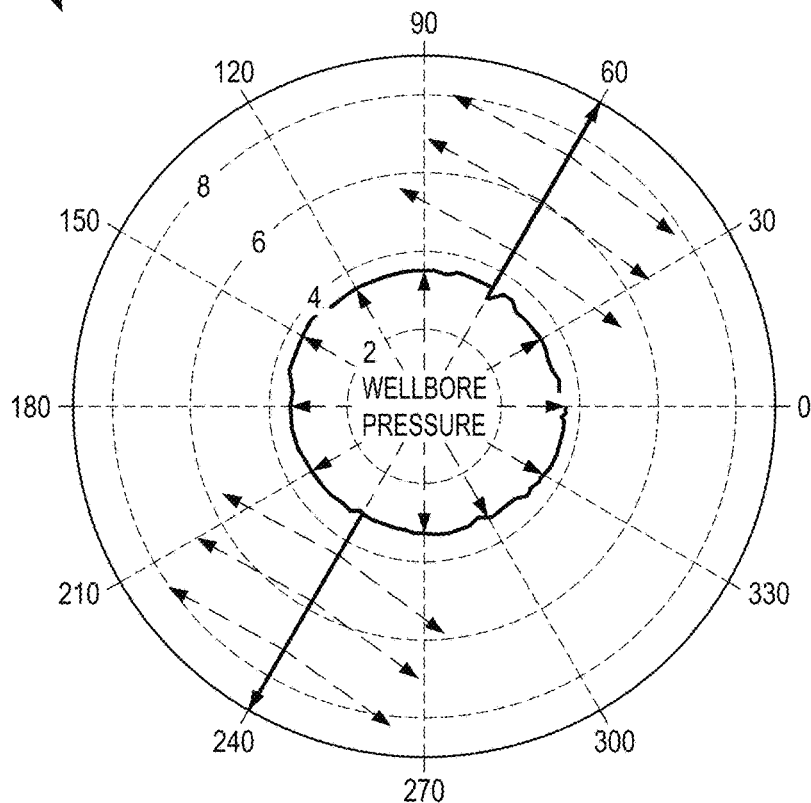
FIG. 21 illustrates an example meshing of a static fracture, in accordance with example implementations of this disclosure.
Figure 21:
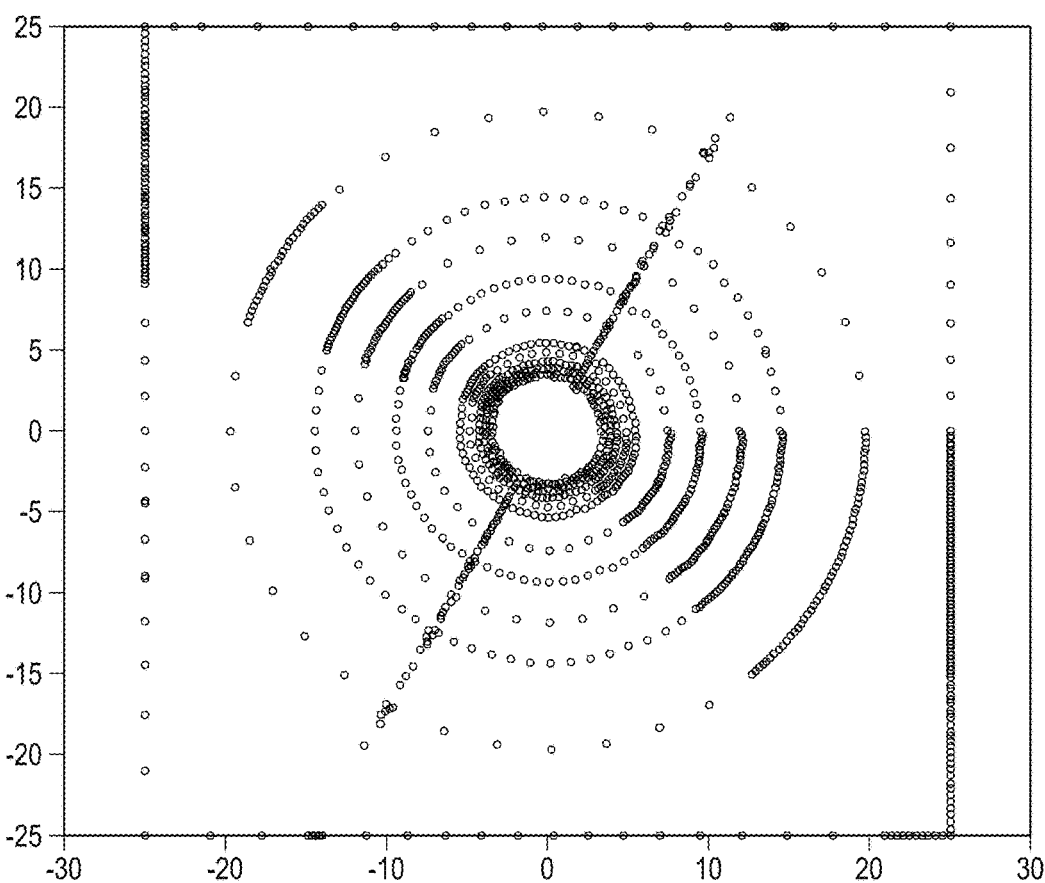

In some implementations, this meshing function can also reflect a fracture. The mesh function takes input such as the fracture aperture, length, tortuosity, and placement within the wellbore so that the geometry of the fracture can be reflected. Based on this, the mesh considers the fracture a part of the wellbore, which makes it exposed to the wellbore pressure. This way of meshing a fracture assumes that the fracture is a static feature of the wellbore. While this assumption may not be applicable for fracture propagation problems, it can be applied to other scenarios as it can be used to reflect the effect of drilling induced fractures, natural fractures, lost circulation, and wellbore strengthening on the drilling window. An illustration of an example of meshing of a static fracture is shown in FIG. 21, where the left plot shows the introduction of fractures to a non-uniform wellbore and a depiction of the wellbore pressure acting on both the wellbore wall and the fracture face, and the right plot shows the placement of nodal coordinate for the mesh of fractured non-uniform wellbore.

Figure 22:
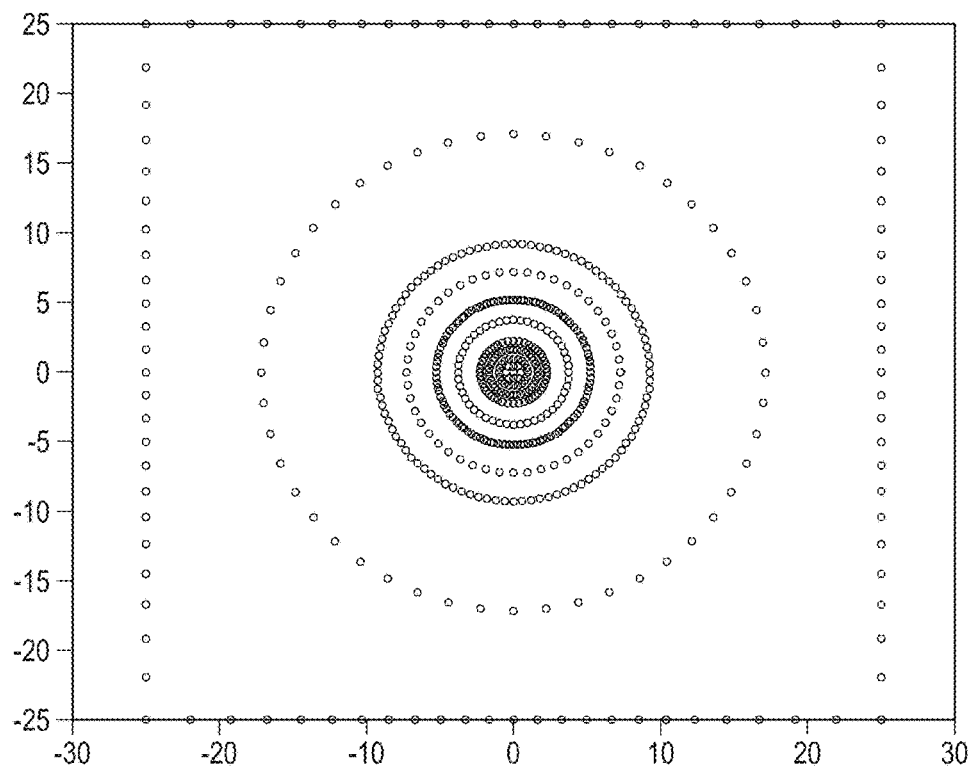
FIG. 22 illustrates example plots of nodal coordinates of a mesh with finite boundary elements and a mesh with infinite boundary elements, in accordance with example implementations of this disclosure.
Figure 22:
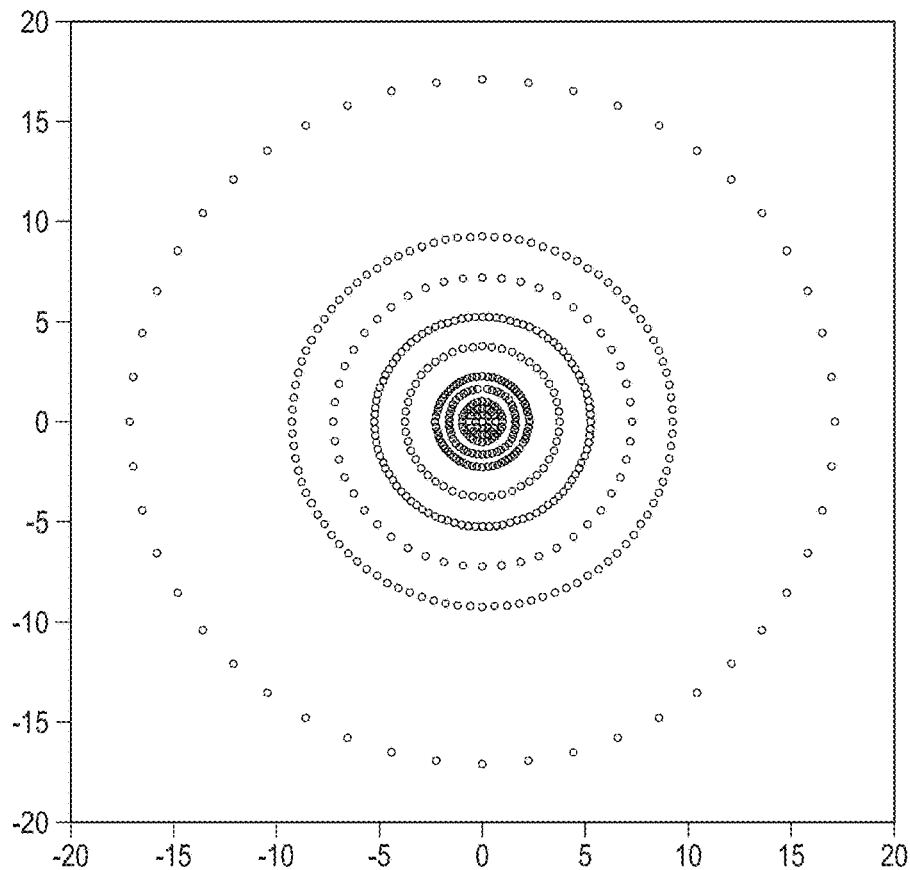

In some implementations, this meshing function can also reflect the shape of the structure boundaries. When a mesh for a numerical model is created, the type of boundaries being used can be specified, and the type of boundaries being used can be reflected on the nodal coordinates calculated. The mesh function can consider a finite mesh boundary and an infinite mesh boundary. The finite mesh boundary means that the mesh elements at boundary of the structure, which will be subject to the outside stresses, are all fully formed elements. In one example, this fully formed element can be a 20-node brick element. As for the infinite mesh boundary, the mesh nodal coordinates are created for those that consider an infinite element, which can be a 20-node brick element with one of the cube faces removed resulting in a 12-node infinite element. The removed face signifies the infinite extension of the subterranean geologic formation being modeled. The mesh function can reflect this infinite nature of these elements by removing all nodes that would have described the removed face. The difference between these two boundaries as produced by the mesh function is shown in FIG. 22.

Figure 23A:
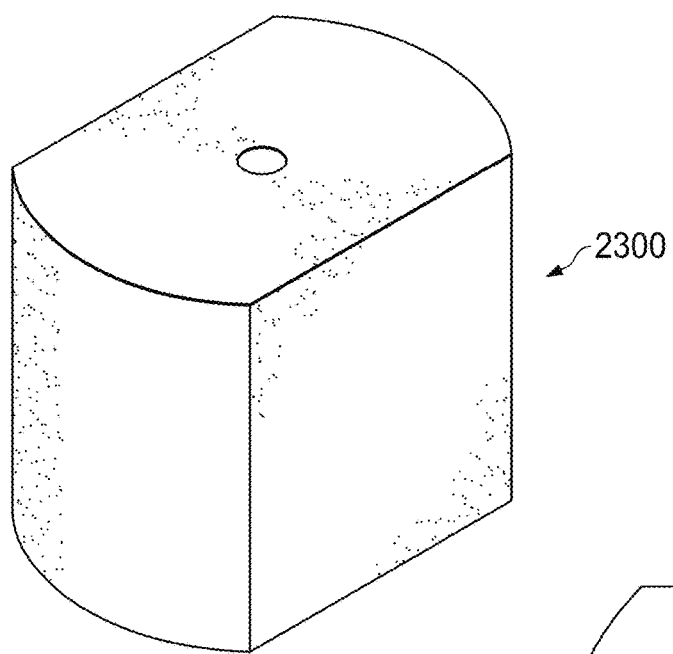
FIG. 23A, FIG. 23B, and FIG. 23C illustrate an example mesh created for modelling core samples, in accordance with example implementations of this disclosure.
Figure 23B:
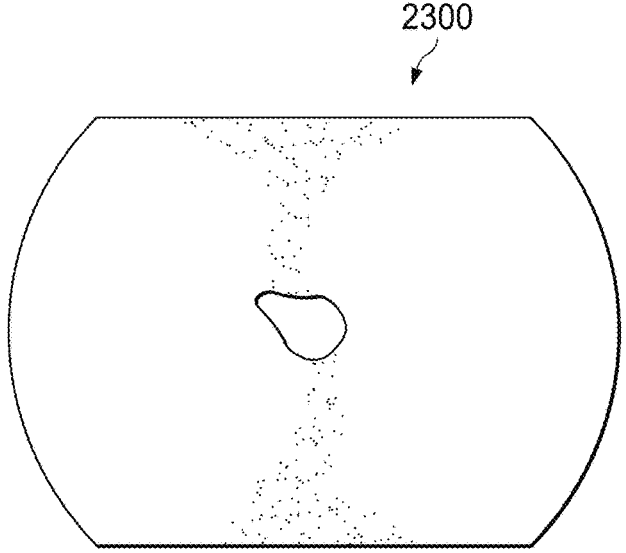
Figure 23C:
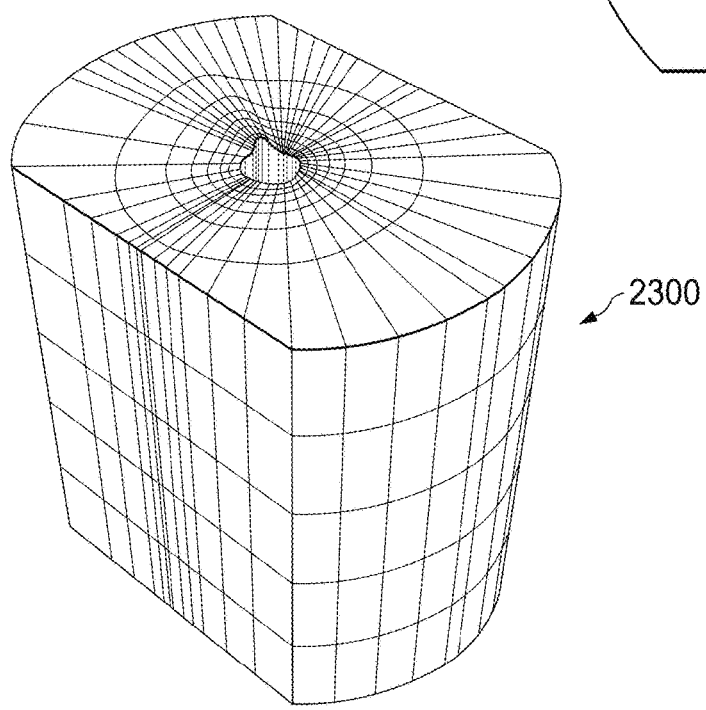

In some implementations, the setup for the structure boundaries within the mesh can be altered when modelling core samples in experiments instead of wells in the field. A specialized meshing function can be created to model the core sample that are discussed in the sections for CT-scan image based algorithm. As these core samples have round boundaries on two side and straight slabbed boundaries on the other two sides, the mesh function places finite element in all sides, but in a manner that mimics the core boundary shape. An illustration of the mesh created for these core samples is shown in FIG. 23A, FIG. 23B, and FIG. 23C.

Example applications of the aforementioned numerical models are described next.

In some implementations, one application of the aforementioned numerical models is providing an advisory on the drilling window limits. The numerical model, which is setup based on the image algorithms and the meshing function described in this disclosure, can provide recommendations of the maximum and minimum allowable mud weight for safe and optimal operations. These mud weights can be determined for the purpose of avoiding wellbore rock failure. Although drilling window advisory systems are common in the industry, some are limited as they produce static recommendations or pre-drilling recommendations. Some existing models lack the ability to update drilling window recommendations in response to commonly occurring drilling events in a dynamic and deterministic manner. The numerical models supported by the image algorithms and the meshing function described in this disclosure can consider the influence of commonly occurring drilling events through the input provided from the shale shakers analysis.

Figure 24:
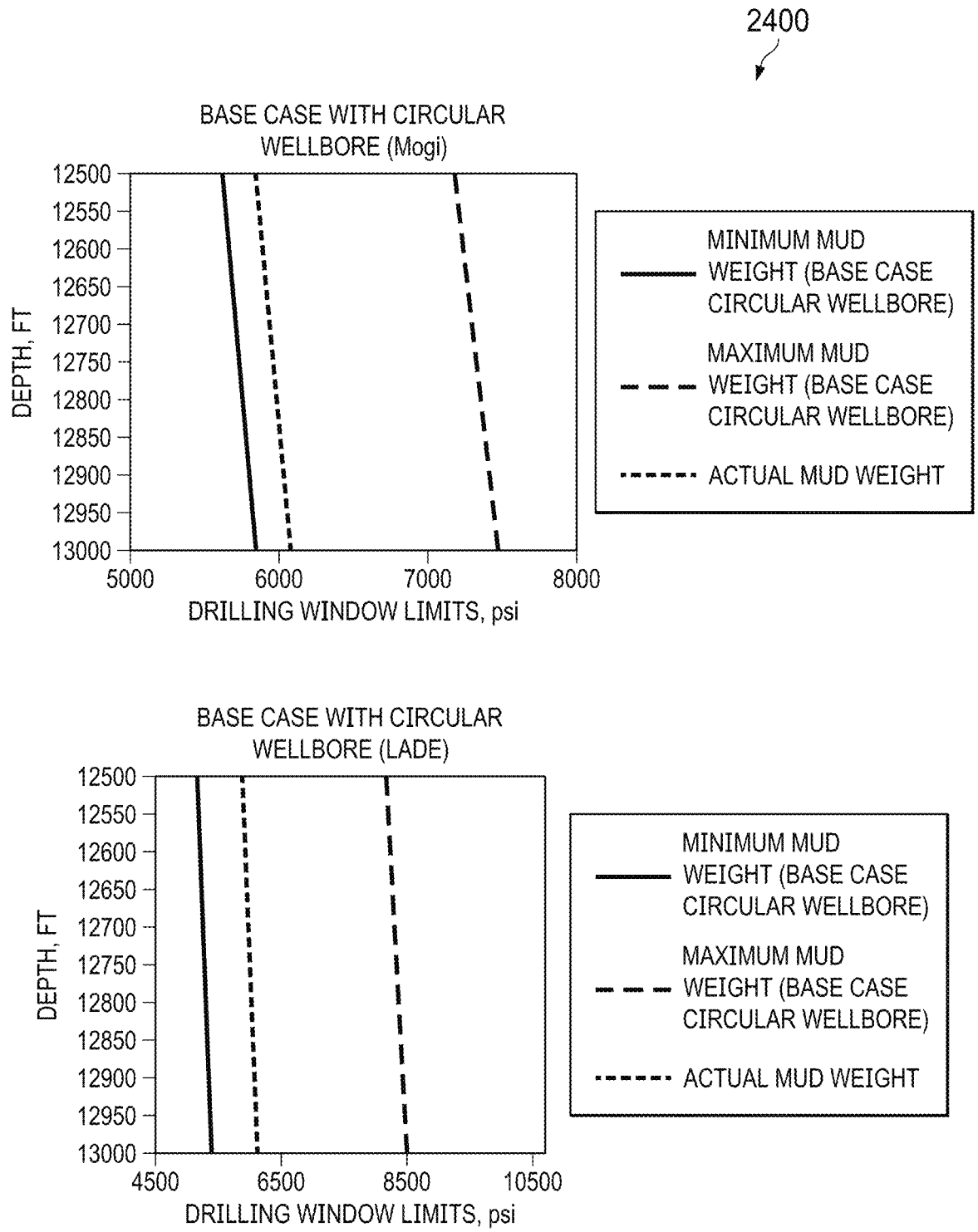
FIG. 24 illustrates example recommendations of mud weights or downhole pressures required to prevent wellbore rock failure based on the output of the initial setup of a numerical model, in accordance with example implementations of this disclosure.
Figure 25:
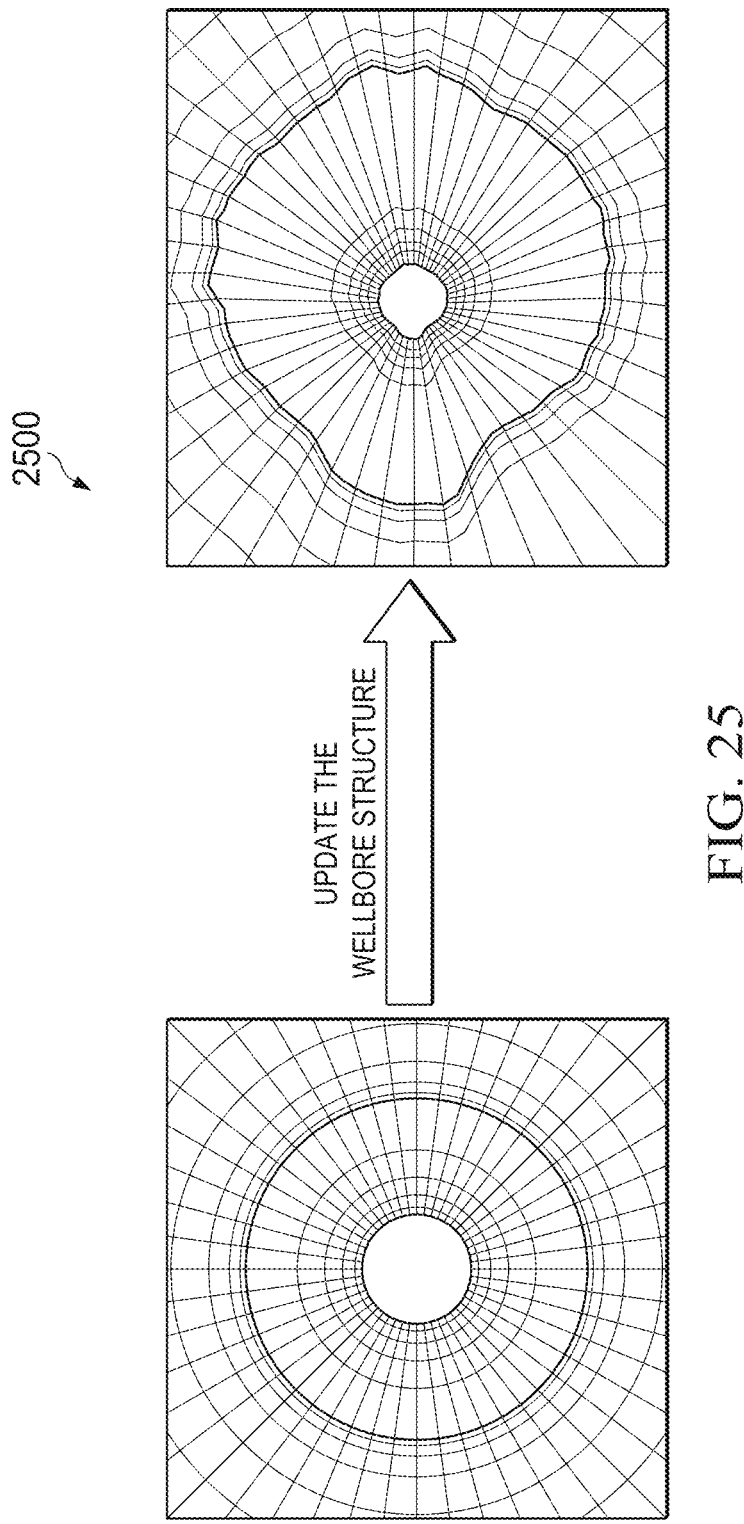
FIG. 25 illustrates an example of updating the wellbore shape and adjusting the structure of the numerical model mesh based on information from logging while drilling wellbore images or from shale shakers images, in accordance with example implementations of this disclosure.
Figure 26:
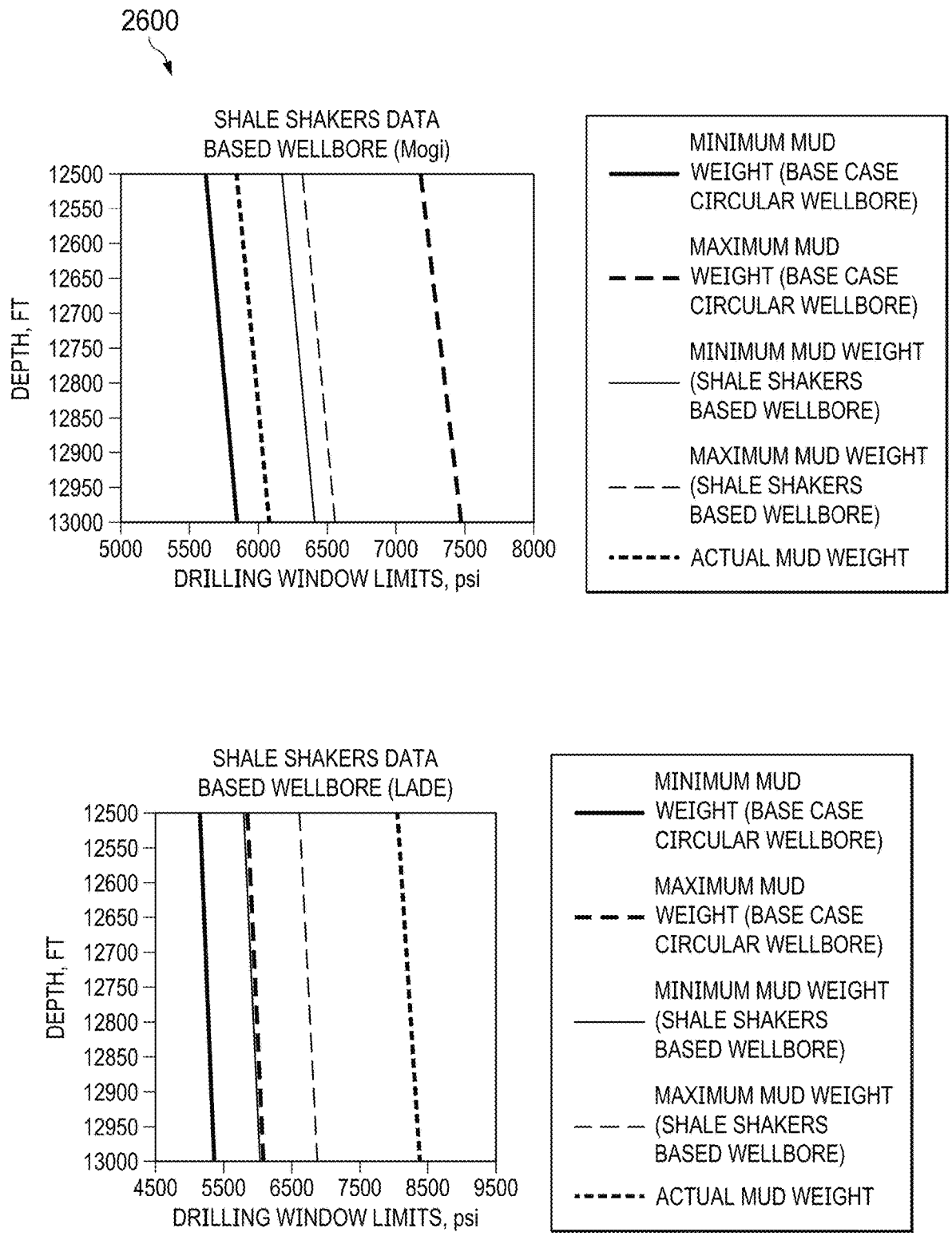
FIG. 26 illustrates an example of updated recommendations of mud weights or downhole pressures required to prevent wellbore rock failure, in accordance with example implementations of this disclosure.
Figure 27:
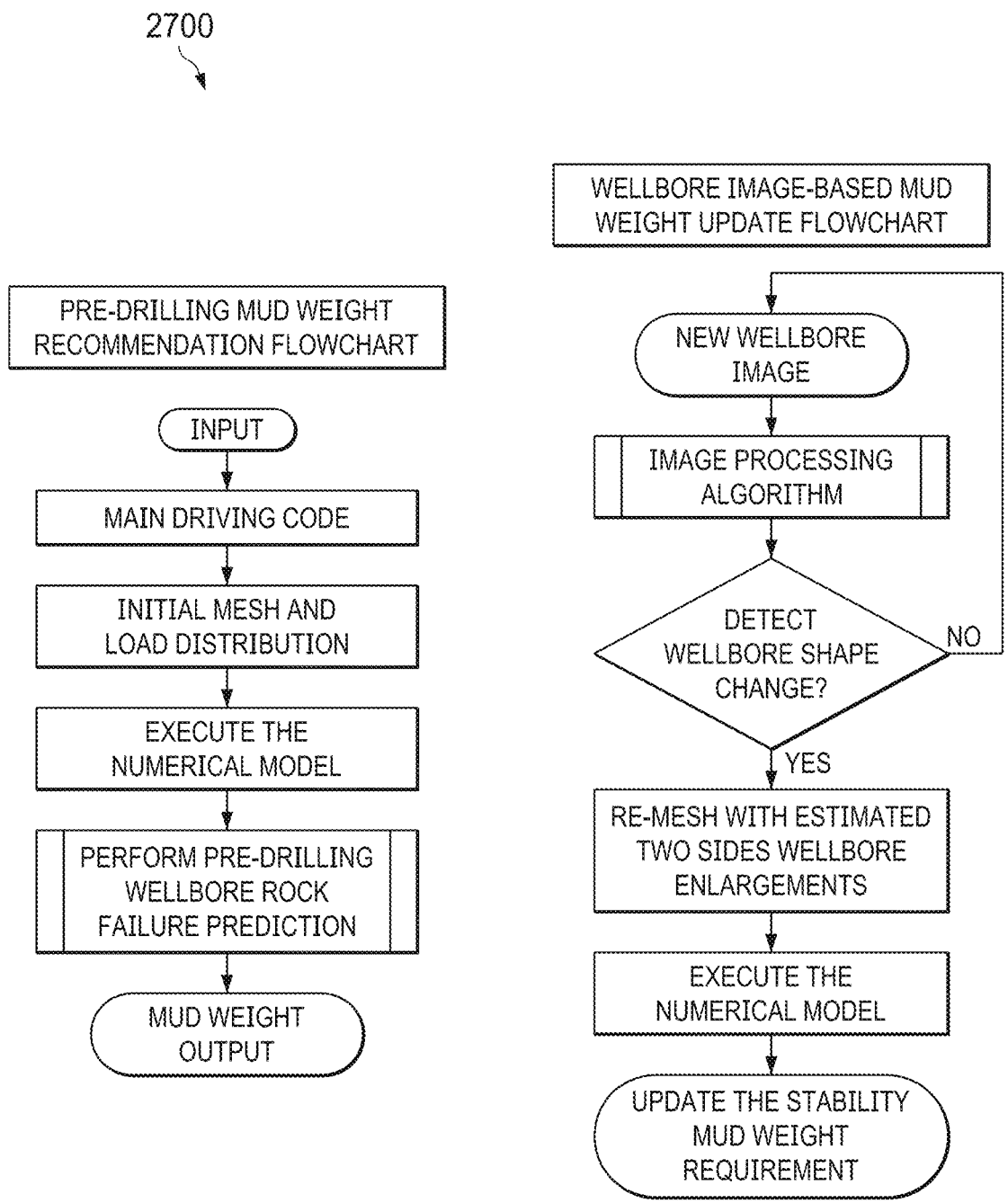
FIG. 27 illustrates example flow charts depicting the distinction between two processes to determine the pre-drilling mud weight and the while-drilling mud weight update, in accordance with example implementations of this disclosure.

FIG. 24 illustrates example pre-drilling recommendations for the drilling window. In some implementations, the drilling window recommendation can be updated based on the input from logging while drilling wellbore images or from the shale shakers image analysis. Through this analysis, the wellbore structure mesh can be updated as shown in FIG. 25. This updated mesh can be inserted into the numerical model described in this disclosure for the purpose of providing the new mud weights limits or downhole pressure required for preventing wellbore failure. An example of the updated output of the model, which relates to recommending mud weights for preventing wellbore rock failure is shown in FIG. 26. Flow charts depicting the distinction between the two processes to determine the pre-drilling mud weight and the while-drilling mud weight update are shown in FIG. 27.

In some implementations, another application of the aforementioned numerical models is improving the accuracy of borehole rock failure prediction. The image analysis algorithms described in this disclosure can be used to overcome simplifying assumptions in some existing drilling geomechanics modeling, and consequently to improve rock failure prediction beyond the use of the conventional failure criteria such as the Mohr-Coulomb, Mogi, and Lade criterion. The use of image analysis algorithms has an advantage over traditional methods, as the use of image logs analysis and re-meshing functions can enable the reflection of the actual shape of the wellbore on the numerical model mesh. Additionally, rather than relying on generalized and conventional failure criteria for predicting rock failure spatially around the wellbore, the numerical model described in this disclosure can use a statistical or a machine learning algorithm that is trained based on the outcome of borehole image logs analysis and the output of the numerical model. The image analysis can set the limits, distribution, and extent of boreholes rock failure for the machine learning algorithm, based on the failure outcome from previous wells or lab experiments.

Figure 28:
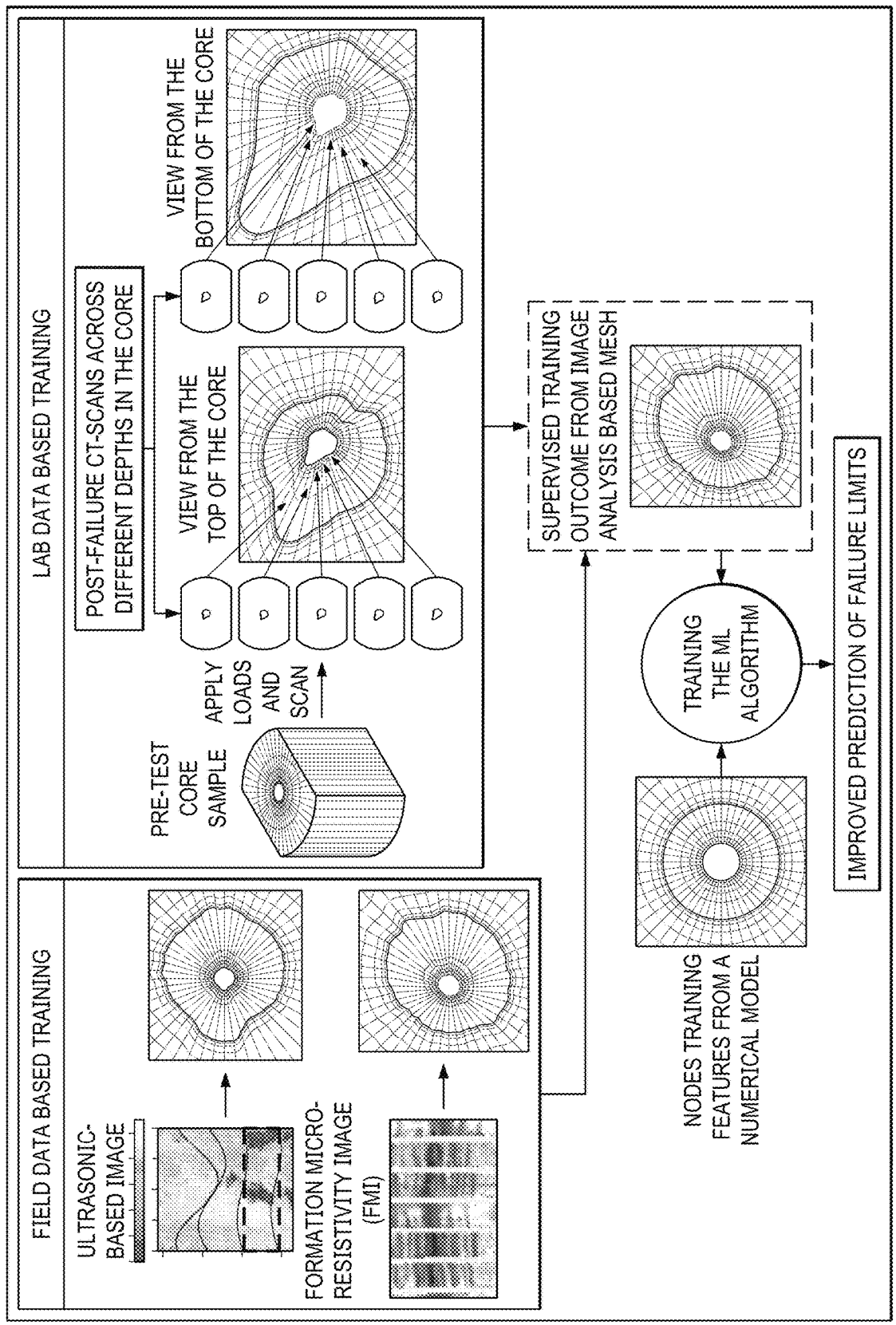
FIG. 28 illustrates an example supervised training process that uses a numerical model output as training features and borehole image interpretations as training responses, in accordance with example implementations of this disclosure.

In some implementations, the supervised training process of the machine learning algorithm can be performed as shown in FIG. 28 using the outcome of the image analysis algorithms. Based on this illustration, relevant information from offset wells can be gathered, which can then be used to model the circular (pre-failure) wellbore in the numerical model as shown in the left-bottom corner in FIG. 28. This can yield the stress distribution at each node in the mesh in the left-bottom corner, which can be represented by different stress invariants and scalar plastic strain. Consequently, this stress distribution can be used to generate an initial prediction of failure based on one of the aforementioned conventional failure criteria. The next step can be interpreting wireline image logs for each wellbore in the offset wells dataset and producing a mesh of the actual failure that had taken place (post-failure wellbore). This step is illustrated in the wellbore in the right bottom corner in FIG. 28. Finally, all data from the available offset wells can be fed into a machine learning algorithm, which can be decision tree based or a neural network, to enhance the prediction of failure. The final trained model can then be used to generate new predictions of failure for new wells. The main advantage here is that the prediction of failure from the trained model can more accurately describe both the circumferential distribution and radial extension of failure zones as opposed to predicting the critical breakout angle, which is produced from conventional modeling approaches and analytical solutions.

Figure 29:
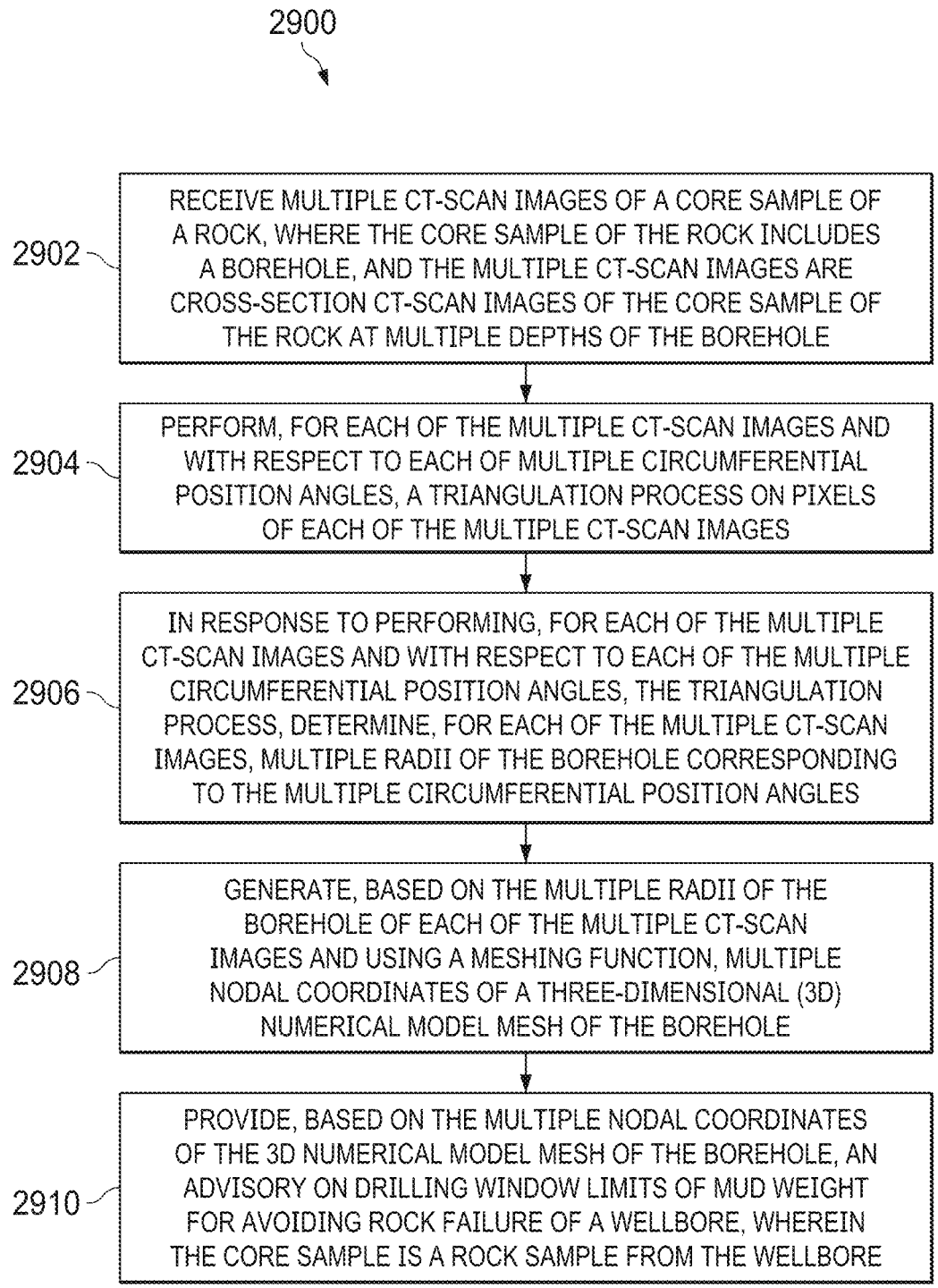
FIG. 29 is a flowchart illustrating an example of a method for implementing a conversion from borehole images into three-dimensional (3D) structures for numerical modeling, in accordance with example implementations of this disclosure.

FIG. 29 illustrates an example method for implementing a conversion from borehole images into three-dimensional (3D) structures for numerical modeling.

At 2902, a computer system receives multiple CT-scan images of a core sample of a rock, where the core sample of the rock includes a borehole, and the multiple CT-scan images are cross-section CT-scan images of the core sample of the rock at multiple depths of the borehole.

At 2904, the computer system performs, for each of the multiple CT-scan images and with respect to each of multiple circumferential position angles, a triangulation process on pixels of each of the multiple CT-scan images.

At 2906, in response to performing the triangulation process for each of the multiple CT-scan images and with respect to each of the multiple circumferential position angles, the computer system determines, for each of the multiple CT-scan images, multiple radii of the borehole corresponding to the multiple circumferential position angles.

At 2908, the computer system generates, based on the multiple radii of the borehole of each of the multiple CT-scan images and using a meshing function, multiple nodal coordinates of a 3D numerical model mesh of the borehole.

At 2910, the computer system provides, based on the multiple nodal coordinates of the 3D numerical model mesh of the borehole, an advisory on drilling window limits of mud weight for avoiding rock failure of a wellbore, where the core sample is a rock sample from the wellbore.

Figure 30:
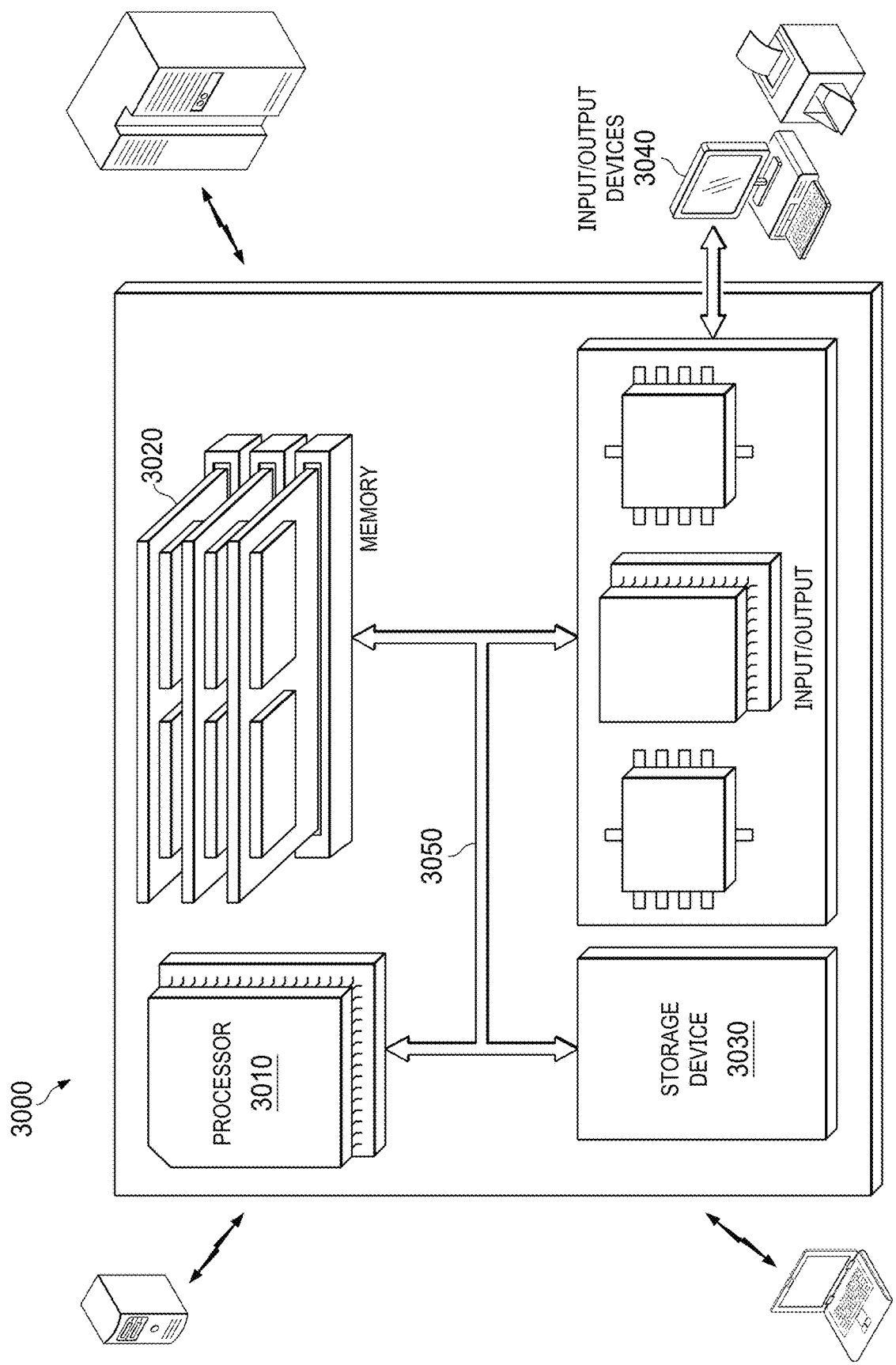
FIG. 30 is a schematic illustration of example computer systems that can be used to execute implementations of the present disclosure.

FIG. 30 illustrates a schematic diagram of an example computing system 3000. The system 3000 can be used for the operations described in association with the implementations described herein. For example, the system 3000 may be included in any or all of the server components discussed herein. The system 3000 includes a processor 3010, a memory 3020, a storage device 3030, and an input/output device 3040. The components 3010, 3020, 3030, and 3040 are interconnected using a system bus 3050. The processor 3010 is capable of processing instructions for execution within the system 3000. In some implementations, the processor 3010 is a single-threaded processor. The processor 3010 is a multi-threaded processor. The processor 3010 is capable of processing instructions stored in the memory 3020 or on the storage device 3030 to display graphical information for a user interface on the input/output device 3040.

The memory 3020 stores information within the system 3000. In some implementations, the memory 3020 is a computer-readable medium. The memory 3020 is a volatile memory unit. The memory 3020 is a non-volatile memory unit. The storage device 3030 is capable of providing mass storage for the system 3000. The storage device 3030 is a computer-readable medium. The storage device 3030 may be a floppy disk device, a hard disk device, an optical disk device, or a tape device. The input/output device 3040 provides input/output operations for the system 3000. The input/output device 3040 includes a keyboard and/or pointing device. The input/output device 3040 includes a display unit for displaying graphical user interfaces.

Certain aspects of the subject matter described here can be implemented as a method. One or more CT-scan images of a core sample of a rock are received. The core sample of the rock includes a borehole, and the one or more CT-scan images are cross-section CT-scan images of the core sample of the rock at one or more depths of the borehole. A triangulation process is performed on pixels of each of the one or more CT-scan images for each of the one or more CT-scan images and with respect to each of one or more circumferential position angles. In response to the triangulation process being performed on pixels of each of the one or more CT-scan images for each of the one or more CT-scan images and with respect to each of one or more circumferential position angles, one or more radii of the borehole corresponding to the one or more circumferential position angles are determined for each of the one or more CT-scan images. One or more nodal coordinates of a three-dimensional (3D) numerical model mesh of the borehole are generated using a meshing function and based on the one or more radii of the borehole of each of the one or more CT-scan images. An advisory on drilling window limits of mud weight for avoiding rock failure of a wellbore is provided based on the one or more nodal coordinates of the 3D numerical model mesh of the borehole. The core sample is a rock sample from the wellbore.

An aspect taken alone or combinable with any other aspect includes the following features. After the one or more CT-scan images are received and before the one or more radii of the borehole corresponding to the one or more circumferential position angles are determined for each of the one or more CT-scan images, a contrast of each of the one or more CT-scan images is adjusted so that borehole void in each of the one or more CT-scan images is of a first color, and rock matrix surrounding the borehole void in each of the one or more CT-scan images is of a second color that is different than the first color.

An aspect taken alone or combinable with any other aspect includes the following features. The determining the one or more radii of the borehole corresponding to the one or more circumferential position angles for each of the one or more CT-scan images includes determining, for each of the one or more CT-scan images, by performing the triangulation process on the pixels of each of the one or more CT-scan images and with respect to one or more horizontal triangulation lines for each of the one or more circumferential position angles, a first plurality of radii of the borehole corresponding to the one or more circumferential position angles; determining, for each of the one or more CT-scan images, by performing the triangulation process on the pixels of each of the one or more CT-scan images and with respect to one or more vertical triangulation lines for each of the one or more circumferential position angles, a second plurality of radii of the borehole corresponding to the one or more circumferential position angles; and determining, for each of the one or more CT-scan images, by combining the first plurality of radii of the borehole and the second plurality of radii of the borehole, the one or more radii of the borehole corresponding to the one or more circumferential position angles.

An aspect taken alone or combinable with any other aspect includes the following features. After the one or more nodal coordinates of the 3D numerical model mesh of the borehole are generated and before the advisory on the drilling window limits of mud weight is provided, a numerical model of the borehole is determined based on the 3D numerical model mesh of the borehole, and a stress distribution around the borehole is determined based on the numerical model of the borehole.

An aspect taken alone or combinable with any other aspect includes the following features. The borehole has a non-uniform shape.

An aspect taken alone or combinable with any other aspect includes the following features. After the one or more of nodal coordinates of the 3D numerical model mesh of the borehole are generated, rock failure prediction of the wellbore is performed based on the one or more nodal coordinates of the 3D numerical model mesh of the borehole.

An aspect taken alone or combinable with any other aspect includes the following features. After the contrast of each of the one or more CT-scan images is adjusted and before the one or more radii of the borehole are determined for each of the one or more CT-scan images, calibrating a size of each of the one or more CT-scan images based on actual pixel size measurement from a reference CT-scan image generated by a device that generates the one or more CT-scan images. The reference CT-scan image includes a CT-scan image of a core sample of a second borehole with uniform shape and a known diameter.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method for three-dimensional (3D) borehole numerical modeling, comprising:
   receiving a plurality of CT-scan images of a core sample of a rock, wherein the core sample of the rock comprises a borehole, and wherein the plurality of CT-scan images are cross-section CT-scan images of the core sample of the rock at a plurality of depths of the borehole;
   performing, for each of the plurality of CT-scan images and with respect to each of a plurality of circumferential position angles, a triangulation process on pixels of each of the plurality of CT-scan images;
   in response to performing, for each of the plurality of CT-scan images and with respect to each of the plurality of circumferential position angles, the triangulation process, determining, for each of the plurality of CT-scan images, a plurality of radii of the borehole corresponding to the plurality of circumferential position angles;
   generating, based on the plurality of radii of the borehole of each of the plurality of CT-scan images and using a meshing function, a plurality of nodal coordinates of 3D numerical model mesh of the borehole; and
   providing, based on the plurality of nodal coordinates of the 3D numerical model mesh of the borehole, an advisory on drilling window limits of mud weight for avoiding rock failure of a wellbore, wherein the core sample is a rock sample from the wellbore.

2. The computer-implemented method according to claim 1, further comprising:
   after receiving the plurality of CT-scan images and before determining, for each of the plurality of CT-scan images, the plurality of radii of the borehole corresponding to the plurality of circumferential position angles, adjusting a contrast of each of the plurality of CT-scan images so that borehole void in each of the plurality of CT-scan images is of a first color, and rock matrix surrounding the borehole void in each of the plurality of CT-scan images is of a second color that is different than the first color.

3. The computer-implemented method according to claim 2, further comprising:
- after adjusting the contrast of each of the plurality of CT-scan images and before determining, for each of the plurality of CT-scan images, the plurality of radii of the borehole, calibrating a size of each of the plurality of CT-scan images based on actual pixel size measurement from a reference CT-scan image generated by a device that generates the plurality of CT-scan images, wherein the reference CT-scan image comprises a CT-scan image of a core sample of a second borehole with uniform shape and a known diameter.

4. The computer-implemented method according to claim 1, wherein determining, for each of the plurality of CT-scan images, the plurality of radii of the borehole corresponding to the plurality of circumferential position angles comprises:
- determining, for each of the plurality of CT-scan images, by performing the triangulation process on the pixels of each of the plurality of CT-scan images and with respect to a plurality of horizontal triangulation lines for each of the plurality of circumferential position angles, a first plurality of radii of the borehole corresponding to the plurality of circumferential position angles;
- determining, for each of the plurality of CT-scan images, by performing the triangulation process on the pixels of each of the plurality of CT-scan images and with respect to a plurality of vertical triangulation lines for each of the plurality of circumferential position angles, a second plurality of radii of the borehole corresponding to the plurality of circumferential position angles; and
- determining, for each of the plurality of CT-scan images, by combining the first plurality of radii of the borehole and the second plurality of radii of the borehole, the plurality of radii of the borehole corresponding to the plurality of circumferential position angles.

5. The computer-implemented method according to claim 1, further comprising:
- after generating the plurality of nodal coordinates of the 3D numerical model mesh of the borehole and before providing the advisory on the drilling window limits of mud weight:
  - determining a numerical model of the borehole based on the 3D numerical model mesh of the borehole; and
  - determining a stress distribution around the borehole based on the numerical model of the borehole.

6. The computer-implemented method according to claim 5, further comprising:
- after generating the plurality of nodal coordinates of the 3D numerical model mesh of the borehole:
  - performing rock failure prediction of the wellbore based on the plurality of nodal coordinates of the 3D numerical model mesh of the borehole.

7. The computer-implemented method according to claim 1, wherein the borehole has a non-uniform shape.

8. A non-transitory, computer-readable medium storing one or more instructions executable by a computer system to perform operations for three-dimensional (3D) borehole numerical modeling, the operations comprising:
- receiving a plurality of CT-scan images of a core sample of a rock, wherein the core sample of the rock comprises a borehole, and wherein the plurality of CT-scan images are cross-section CT-scan images of the core sample of the rock at a plurality of depths of the borehole;
- performing, for each of the plurality of CT-scan images and with respect to each of a plurality of circumferential position angles, a triangulation process on pixels of each of the plurality of CT-scan images;
- in response to performing, for each of the plurality of CT-scan images and with respect to each of the plurality of circumferential position angles, the triangulation process, determining, for each of the plurality of CT-scan images, a plurality of radii of the borehole corresponding to the plurality of circumferential position angles;
- generating, based on the plurality of radii of the borehole of each of the plurality of CT-scan images and using a meshing function, a plurality of nodal coordinates of 3D numerical model mesh of the borehole; and
- providing, based on the plurality of nodal coordinates of the 3D numerical model mesh of the borehole, an advisory on drilling window limits of mud weight for avoiding rock failure of a wellbore, wherein the core sample is a rock sample from the wellbore.

9. The non-transitory, computer-readable medium according to claim 8, wherein the operations further comprise:
- after receiving the plurality of CT-scan images and before determining, for each of the plurality of CT-scan images, the plurality of radii of the borehole corresponding to the plurality of circumferential position angles, adjusting a contrast of each of the plurality of CT-scan images so that borehole void in each of the plurality of CT-scan images is of a first color, and rock matrix surrounding the borehole void in each of the plurality of CT-scan images is of a second color that is different than the first color.

10. The non-transitory, computer-readable medium according to claim 9, wherein the operations further comprise:
- after adjusting the contrast of each of the plurality of CT-scan images and before determining, for each of the plurality of CT-scan images, the plurality of radii of the borehole, calibrating a size of each of the plurality of CT-scan images based on actual pixel size measurement from a reference CT-scan image generated by a device that generates the plurality of CT-scan images, wherein the reference CT-scan image comprises a CT-scan image of a core sample of a second borehole with uniform shape and a known diameter.

11. The non-transitory, computer-readable medium according to claim 8, wherein determining, for each of the plurality of CT-scan images, the plurality of radii of the borehole corresponding to the plurality of circumferential position angles comprises:
- determining, for each of the plurality of CT-scan images, by performing the triangulation process on the pixels of each of the plurality of CT-scan images and with respect to a plurality of horizontal triangulation lines for each of the plurality of circumferential position angles, a first plurality of radii of the borehole corresponding to the plurality of circumferential position angles;
- determining, for each of the plurality of CT-scan images, by performing the triangulation process on the pixels of each of the plurality of CT-scan images and with respect to a plurality of vertical triangulation lines for each of the plurality of circumferential position angles, a second plurality of radii of the borehole corresponding to the plurality of circumferential position angles; and determining, for each of the plurality of CT-scan images, by combining the first plurality of radii of the borehole and the second plurality of radii of the borehole, the plurality of radii of the borehole corresponding to the plurality of circumferential position angles.

12. The non-transitory, computer-readable medium according to claim 8, wherein the operations further comprise:
after generating the plurality of nodal coordinates of the 3D numerical model mesh of the borehole and before providing the advisory on the drilling window limits of mud weight:
determining a numerical model of the borehole based on the 3D numerical model mesh of the borehole; and
determining a stress distribution around the borehole based on the numerical model of the borehole.

13. The non-transitory, computer-readable medium according to claim 12, wherein the operations further comprise:
after generating the plurality of nodal coordinates of the 3D numerical model mesh of the borehole:
performing rock failure prediction of the wellbore based on the plurality of nodal coordinates of the 3D numerical model mesh of the borehole.

14. The non-transitory, computer-readable medium according to claim 8, wherein the borehole has a non-uniform shape.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations for three-dimensional (3D) borehole numerical modeling, the one or more operations comprising:
receiving a plurality of CT-scan images of a core sample of a rock, wherein the core sample of the rock comprises a borehole, and wherein the plurality of CT-scan images are cross-section CT-scan images of the core sample of the rock at a plurality of depths of the borehole;
performing, for each of the plurality of CT-scan images and with respect to each of a plurality of circumferential position angles, a triangulation process on pixels of each of the plurality of CT-scan images;
in response to performing, for each of the plurality of CT-scan images and with respect to each of the plurality of circumferential position angles, the triangulation process, determining, for each of the plurality of CT-scan images, a plurality of radii of the borehole corresponding to the plurality of circumferential position angles;
generating, based on the plurality of radii of the borehole of each of the plurality of CT-scan images and using a meshing function, a plurality of nodal coordinates of 3D numerical model mesh of the borehole; and
providing, based on the plurality of nodal coordinates of the 3D numerical model mesh of the borehole, an advisory on drilling window limits of mud weight for avoiding rock failure of a wellbore, wherein the core sample is a rock sample from the wellbore.

16. The computer-implemented system according to claim 15, wherein the one or more operations further comprise:
after receiving the plurality of CT-scan images and before determining, for each of the plurality of CT-scan images, the plurality of radii of the borehole corresponding to the plurality of circumferential position angles, adjusting a contrast of each of the plurality of CT-scan images so that borehole void in each of the plurality of CT-scan images is of a first color, and rock matrix surrounding the borehole void in each of the plurality of CT-scan images is of a second color that is different than the first color.

17. The computer-implemented system according to claim 15, wherein determining, for each of the plurality of CT-scan images, the plurality of radii of the borehole corresponding to the plurality of circumferential position angles comprises:
determining, for each of the plurality of CT-scan images, by performing the triangulation process on the pixels of each of the plurality of CT-scan images and with respect to a plurality of horizontal triangulation lines for each of the plurality of circumferential position angles, a first plurality of radii of the borehole corresponding to the plurality of circumferential position angles;
determining, for each of the plurality of CT-scan images, by performing the triangulation process on the pixels of each of the plurality of CT-scan images and with respect to a plurality of vertical triangulation lines for each of the plurality of circumferential position angles, a second plurality of radii of the borehole corresponding to the plurality of circumferential position angles; and
determining, for each of the plurality of CT-scan images, by combining the first plurality of radii of the borehole and the second plurality of radii of the borehole, the plurality of radii of the borehole corresponding to the plurality of circumferential position angles.

18. The computer-implemented system according to claim 15, wherein the one or more operations further comprise:
after generating the plurality of nodal coordinates of the 3D numerical model mesh of the borehole and before providing the advisory on the drilling window limits of mud weight:
determining a numerical model of the borehole based on the 3D numerical model mesh of the borehole; and
determining a stress distribution around the borehole based on the numerical model of the borehole.

19. The computer-implemented system according to claim 15, wherein the borehole has a non-uniform shape.

20. The computer-implemented system according to claim 19, wherein the one or more operations further comprise:
after generating the plurality of nodal coordinates of the 3D numerical model mesh of the borehole:
performing rock failure prediction of the wellbore based on the plurality of nodal coordinates of the 3D numerical model mesh of the borehole.

* * * * *